United States Patent
Azmoon et al.

(10) Patent No.: US 11,625,141 B2
(45) Date of Patent: Apr. 11, 2023

(54) USER INTERFACE GENERATION WITH MACHINE LEARNING

(71) Applicant: ServiceNow, Inc., Santa Clara, CA (US)

(72) Inventors: Troy Azmoon, San Diego, CA (US); Aaron Wade, San Diego, CA (US); Rita Maria Castillo, San Diego, CA (US)

(73) Assignee: ServiceNow, Inc., Santa Clara, CA (US)

( * ) Notice: Subject to any disclaimer, the term of this patent is extended or adjusted under 35 U.S.C. 154(b) by 171 days.

(21) Appl. No.: 17/028,474

(22) Filed: Sep. 22, 2020

(65) Prior Publication Data

US 2022/0091726 A1 Mar. 24, 2022

(51) Int. Cl.
*G06F 3/04817* (2022.01)
*G06F 16/901* (2019.01)
(Continued)

(52) U.S. Cl.
CPC ...... *G06F 3/04817* (2013.01); *G06F 16/9024* (2019.01); *G06F 18/214* (2023.01); *G06N 20/00* (2019.01)

(58) Field of Classification Search
CPC ............. G06F 11/3466; G06F 16/9035; G06F 3/04812; G06F 8/20; G06F 11/3438;
(Continued)

(56) References Cited

U.S. PATENT DOCUMENTS 4,941,084 A 7/1990 Terada et al.
5,185,860 A 2/1993 Wu
(Continued)

FOREIGN PATENT DOCUMENTS

CA 2642401 A1 * 5/2010 ............... G06N 3/02
CA 3099659 A1 * 11/2019 ......... B62D 15/0215
(Continued)

OTHER PUBLICATIONS

United States Patent and Trademark Office, Non-Final Office Action dated Mar. 1, 2021, issued in connection with U.S. Appl. No. 17/028,359, filed Sep. 22, 2020, 11 pages.
United States Patent and Trademark Office, Notice of Allowance dated Jul. 8, 2021, issued in connection with U.S. Appl. No. 17/028,359, filed Sep. 22, 2020, 6 pages.
(Continued)

*Primary Examiner* — Steven P Sax
(74) *Attorney, Agent, or Firm* — McDonnell Boehnen Hulbert & Berghoff LLP

(57) ABSTRACT

A system includes a processor configured to perform operations, including receiving, from a client device, a request, associated with a user identifier, for rendering of a graphical user interface (GUI), and obtaining, based on the request and from persistent storage, a framework definition that specifies a first plurality of components and a layout thereof within the GUI. The operations also include determining a second plurality of components by way of a machine learning model and based on attributes associated with the user identifier, and determining, for each respective component of the second plurality of components, a corresponding visual format and a corresponding position within the GUI. The operations further include updating the framework definition by combining the first plurality of components and the second plurality of components based on the corresponding visual format and the corresponding position, and transmitting the framework definition as updated to the client device.

20 Claims, 12 Drawing Sheets

(51) Int. Cl.
*G06N 20/00* (2019.01)
*G06F 18/214* (2023.01)

(58) Field of Classification Search
CPC ...... G06F 9/451; G06F 16/285; G06F 3/0484; G06F 3/0482; G06F 9/024; G06F 3/04817; G06F 3/0488; G06F 18/214; G06Q 30/0241; G06Q 10/101; G06Q 30/0643; G06N 20/00; H04L 67/22
See application file for complete search history.

(56) References Cited

U.S. PATENT DOCUMENTS

| | | | |
|---|---|---|---|
| 5,237,518 | A | 8/1993 | Sztipanovits et al. |
| 5,261,097 | A | 11/1993 | Saxon |
| 5,265,252 | A | 11/1993 | Rawson, III et al. |
| 5,347,626 | A | 9/1994 | Hoeber et al. |
| 5,367,685 | A | 11/1994 | Gosling |
| 5,390,297 | A | 2/1995 | Barber et al. |
| 5,442,791 | A | 8/1995 | Wrabetz et al. |
| 5,452,415 | A | 9/1995 | Hotka |
| 5,522,042 | A | 5/1996 | Fee et al. |
| 5,533,116 | A | 7/1996 | Vesterinen |
| 5,655,081 | A | 8/1997 | Bonnell et al. |
| 5,659,736 | A | 8/1997 | Hasegawa et al. |
| 5,671,412 | A | 9/1997 | Christiano |
| 5,696,701 | A | 12/1997 | Burgess et al. |
| 5,715,463 | A | 2/1998 | Merkin |
| 5,745,879 | A | 4/1998 | Wyman |
| 5,761,502 | A | 6/1998 | Jacobs |
| 5,764,913 | A | 6/1998 | Jancke et al. |
| 5,887,139 | A | 3/1999 | Madison, Jr. et al. |
| 5,909,217 | A | 6/1999 | Bereiter |
| 5,937,165 | A | 8/1999 | Schwaller et al. |
| 5,949,976 | A | 9/1999 | Chappelle |
| 5,978,594 | A | 11/1999 | Bonnell et al. |
| 6,021,437 | A | 2/2000 | Chen et al. |
| 6,041,347 | A | 3/2000 | Harsham et al. |
| 6,088,717 | A | 7/2000 | Reed et al. |
| 6,101,500 | A | 8/2000 | Lau |
| 6,128,016 | A | 10/2000 | Coelho et al. |
| 6,131,118 | A | 10/2000 | Stupek, Jr. et al. |
| 6,134,581 | A | 10/2000 | Ismael et al. |
| 6,138,122 | A | 10/2000 | Smith et al. |
| 6,148,335 | A | 11/2000 | Haggard et al. |
| 6,166,732 | A | 12/2000 | Mitchell et al. |
| 6,167,448 | A | 12/2000 | Hemphill et al. |
| 6,175,866 | B1 | 1/2001 | Holloway et al. |
| 6,175,878 | B1 | 1/2001 | Seaman et al. |
| 6,260,050 | B1 | 7/2001 | Yost et al. |
| 6,263,457 | B1 | 7/2001 | Anderson et al. |
| 6,272,150 | B1 | 8/2001 | Hrastar et al. |
| 6,336,138 | B1 | 1/2002 | Caswell et al. |
| 6,363,421 | B2 | 3/2002 | Barker et al. |
| 6,393,386 | B1 | 5/2002 | Zager et al. |
| 6,397,245 | B1 | 5/2002 | Johnson, II et al. |
| 6,434,626 | B1 | 8/2002 | Prakash et al. |
| 6,438,592 | B1 | 8/2002 | Killian |
| 6,456,306 | B1 | 9/2002 | Chin et al. |
| 6,466,932 | B1 | 10/2002 | Dennis et al. |
| 6,487,590 | B1 | 11/2002 | Foley et al. |
| 6,505,248 | B1 | 1/2003 | Casper et al. |
| 6,526,442 | B1 | 2/2003 | Stupek, Jr. et al. |
| 6,621,823 | B1 | 9/2003 | Mellquist et al. |
| 6,707,795 | B1 | 3/2004 | Noorhosseini et al. |
| 6,742,015 | B1 | 5/2004 | Bowman-Amuah |
| 6,763,380 | B1 | 7/2004 | Mayton et al. |
| 6,816,898 | B1 | 11/2004 | Scarpelli et al. |
| 6,895,586 | B1 | 5/2005 | Brasher et al. |
| 6,948,175 | B1 | 9/2005 | Fong et al. |
| 6,985,901 | B1 | 1/2006 | Sachse et al. |
| 7,003,564 | B2 | 2/2006 | Greuel et al. |
| 7,028,228 | B1 | 4/2006 | Lovy et al. |
| 7,043,537 | B1 | 5/2006 | Pratt |
| 7,043,661 | B2 | 5/2006 | Valadarsky et al. |
| 7,062,683 | B2 | 6/2006 | Warpenburg et al. |
| 7,096,459 | B2 | 8/2006 | Keller et al. |
| 7,146,574 | B2 | 12/2006 | Goldthwaite et al. |
| 7,197,466 | B1 | 3/2007 | Peterson et al. |
| 7,215,360 | B2 | 5/2007 | Gupta |
| 7,216,304 | B1 | 5/2007 | Gourdol et al. |
| 7,219,304 | B1 * | 5/2007 | Kraenzel ................ H04L 67/24 715/740 |
| 7,222,147 | B1 | 5/2007 | Black et al. |
| 7,281,170 | B2 | 10/2007 | Taylor et al. |
| 7,412,502 | B2 | 8/2008 | Fearn et al. |
| 7,505,872 | B2 | 3/2009 | Keller et al. |
| 7,593,013 | B2 | 9/2009 | Agutter et al. |
| 7,596,716 | B2 | 9/2009 | Frost et al. |
| 7,617,073 | B2 | 11/2009 | Trinon et al. |
| 7,660,731 | B2 | 2/2010 | Chaddha et al. |
| 7,676,294 | B2 | 3/2010 | Baier et al. |
| 7,676,437 | B2 | 3/2010 | Satkunanathan et al. |
| 7,840,490 | B1 | 11/2010 | Sellers et al. |
| 7,877,783 | B1 | 1/2011 | Cline et al. |
| 7,890,869 | B1 | 2/2011 | Mayer et al. |
| 7,966,398 | B2 | 6/2011 | Wiles, Jr. |
| 8,060,396 | B1 | 11/2011 | Bessler et al. |
| 8,196,210 | B2 | 6/2012 | Sterin |
| 8,321,948 | B2 | 11/2012 | Robinson et al. |
| 8,407,669 | B2 | 3/2013 | Yee et al. |
| 8,554,750 | B2 | 10/2013 | Rangarajan et al. |
| 8,595,647 | B2 | 11/2013 | Sabin et al. |
| 8,620,818 | B2 | 12/2013 | Hughes et al. |
| 8,646,093 | B2 | 2/2014 | Myers et al. |
| 8,674,992 | B2 | 3/2014 | Poston et al. |
| 8,725,647 | B2 | 5/2014 | Disciascio et al. |
| 9,053,460 | B2 | 6/2015 | Gilbert et al. |
| 10,169,680 | B1 * | 1/2019 | Sachdeva ............... G06N 3/045 |
| 10,402,064 | B1 * | 9/2019 | Al-Sallami ........... G06F 40/186 |
| 10,614,345 | B1 * | 4/2020 | Tecuci .................... G06N 20/20 |
| 10,846,106 | B1 * | 11/2020 | Curie ...................... G06F 9/451 |
| 11,159,671 | B2 * | 10/2021 | Miloseski ............... G06F 9/451 |
| 11,182,691 | B1 * | 11/2021 | Zhang ................... G06N 20/20 |
| 11,341,627 | B2 * | 5/2022 | Sarkisian ............... G06N 20/00 |
| 2002/0116340 | A1 | 8/2002 | Hellberg et al. |
| 2002/0133584 | A1 | 9/2002 | Greuel et al. |
| 2002/0158969 | A1 | 10/2002 | Gupta |
| 2003/0118087 | A1 | 6/2003 | Goldthwaite et al. |
| 2003/0200293 | A1 | 10/2003 | Fearn et al. |
| 2004/0237051 | A1 | 11/2004 | Clauson |
| 2005/0015217 | A1 | 1/2005 | Weidl et al. |
| 2005/0091356 | A1 | 4/2005 | Izzo |
| 2006/0026453 | A1 | 2/2006 | Frost et al. |
| 2006/0095461 | A1 | 5/2006 | Raymond |
| 2006/0179058 | A1 | 8/2006 | Bram et al. |
| 2006/0242557 | A1 | 10/2006 | Nortis, III |
| 2006/0293942 | A1 | 12/2006 | Chaddha et al. |
| 2007/0033279 | A1 | 2/2007 | Battat et al. |
| 2007/0188494 | A1 | 8/2007 | Agutter et al. |
| 2007/0288389 | A1 | 12/2007 | Vaughan et al. |
| 2008/0034314 | A1 | 2/2008 | Louch et al. |
| 2008/0133289 | A1 | 6/2008 | Armour et al. |
| 2008/0141166 | A1 * | 6/2008 | Goldberg ................ H04L 41/22 715/788 |
| 2008/0148253 | A1 | 6/2008 | Badwe et al. |
| 2008/0155455 | A1 * | 6/2008 | Balasubramanian ........................ G06F 3/0481 715/779 |
| 2008/0313561 | A1 * | 12/2008 | Tsao .......................... G06F 8/24 715/810 |
| 2008/0319779 | A1 | 12/2008 | Hughes et al. |
| 2009/0088875 | A1 | 4/2009 | Baier et al. |
| 2009/0089131 | A1 * | 4/2009 | Moukas ............. G06Q 30/0267 705/70 |
| 2009/0204928 | A1 | 8/2009 | Kallio et al. |
| 2009/0228824 | A1 | 9/2009 | Forstall et al. |
| 2009/0228984 | A1 | 9/2009 | Sterin |
| 2009/0327955 | A1 * | 12/2009 | Mouilleseaux ..... G06F 3/04812 715/810 |
| 2010/0110932 | A1 | 5/2010 | Doran et al. |
| 2012/0227000 | A1 | 9/2012 | McCoy et al. |

(56) References Cited

U.S. PATENT DOCUMENTS

| | | | |
|---|---|---|---|
| 2013/0019173 A1* | 1/2013 | Kotler | G06F 3/04883 |
| | | | 715/834 |
| 2013/0019175 A1* | 1/2013 | Kotler | G06F 3/0482 |
| | | | 715/728 |
| 2013/0125052 A1* | 5/2013 | Baird | G06F 3/0482 |
| | | | 715/810 |
| 2013/0151681 A1* | 6/2013 | Dournov | G06F 8/656 |
| | | | 718/103 |
| 2013/0205246 A1* | 8/2013 | Schmidt | G06F 40/134 |
| | | | 715/781 |
| 2015/0378521 A1 | 12/2015 | Wang | |
| 2016/0132203 A1* | 5/2016 | Seto | G06F 3/0482 |
| | | | 715/830 |
| 2016/0275189 A1 | 9/2016 | Narayanan et al. | |
| 2020/0226195 A1* | 7/2020 | Ziraknejad | G06F 3/0482 |
| 2020/0274894 A1* | 8/2020 | Argoeti | G06F 7/556 |
| 2020/0341779 A1* | 10/2020 | Rohde | G06F 11/3466 |
| 2020/0341780 A1* | 10/2020 | Andolina | G06F 16/285 |
| 2020/0341781 A1* | 10/2020 | Schoppe | G06Q 30/0643 |
| 2021/0149788 A1* | 5/2021 | Downie | G06F 11/3604 |
| 2021/0157562 A1* | 5/2021 | Sethi | G06F 9/453 |
| 2021/0272128 A1* | 9/2021 | Slawson | G06F 40/169 |
| 2021/0406099 A1* | 12/2021 | Feuz | H04L 51/224 |

FOREIGN PATENT DOCUMENTS

| | | | | |
|---|---|---|---|---|
| CA | 3073900 C | * | 12/2020 | A63F 13/213 |
| EP | 0433979 | | 6/1991 | |
| EP | 1607824 | | 12/2005 | |
| FR | 2910661 A1 | * | 6/2008 | G06F 17/30705 |
| WO | WO 99/34285 | | 7/1999 | |
| WO | WO 00/52559 | | 9/2000 | |
| WO | WO 01/79970 | | 10/2001 | |
| WO | WO-2021046241 A1 | * | 3/2021 | G06K 9/6262 |

OTHER PUBLICATIONS

Matt Klein, How to Add, Remove, and Customize Tiles on the Windows 10 Start Menu, How-To Geek, Last Updated on Jul. 10, 2017, 8 Pages, Available at https://www.howtogeek.com/223254/how-to-add-remove-and-customize-tiles-on-the-windows-10-start-menu/.

* cited by examiner

USER INTERFACE GENERATION WITH MACHINE LEARNING

BACKGROUND

A graphical user interface (GUI) may facilitate the interaction between a user and a computing device. A GUI may include a plurality of components arranged account to a layout. The GUI may allow a user to interact with a software application, a webpage, a file, and/or other resources using graphical icons, rather than text-based entries. The graphical icons may be visually representative of the resources to which they correspond to further facilitate the interaction.

SUMMARY

GUIs may utilize a same or similar set of components for different users. While the information displayed by these components may vary across users and/or over time, the components themselves may remain constant. Some GUIs may allow each user to make modifications to the components, thus allowing the GUIs to be customized on a user-by-user basis. Nevertheless, even when such a GUI is customized by a user, the components thereof remain constant until the user performs further manual modifications to the GUI. Thus, such GUIs are not configured to automatically adapt the components thereof to user behavior, availability of new data to be displayed, and/or other contextual changes.

Provided herein are operations, models, and systems configured to automatically change over time the components that make up a particular GUI. Specifically, an example GUI may include a first plurality of predetermined components, each of which may be associated with a corresponding resource or group of resources, such as a software application, a webpage, a file, and/or other data. The predetermined components may occupy a first portion of the GUI, while the remainder of the GUI may be left open to be populated by dynamically-determined components. Thus, the first plurality of predetermined components may provide an element of constancy in the user experience over time and/or across users, while the dynamically-determined components may allow the GUI to adapt to changes in user behavior, attributes of data to be displayed, and/or other contextual factors, parameters, and/or attributes.

Specifically, a machine learning model may be configured to select, generate, and/or otherwise determine the dynamically-determined components. The machine learning model may be trained to determine the dynamically-determined components on the basis of one or more attributes associated with the user requesting the GUI to be rendered, one or more attributes associated with the resources and/or data to be represented by the dynamically-determined components, a portion of the GUI in which the dynamically-determined components are to be displayed, one or more components provided to and/or used by other users belonging to a same group as the user, and/or other contextual factors, parameters, and/or attributes. Each of these inputs to the machine learning model may suggest a different set of components to be included in the GUI and, through training, the machine learning model may be configured to weigh these suggestions to arrive at a set of components predicted to be most useful to and/or otherwise preferred by the user.

Further, each component selected by the machine learning model may also be assigned a corresponding position within the GUI and a corresponding visual format. The component positons and visual formats may be generated by another machine learning model and/or by rule-based algorithms. In some cases, the determined visual formats and positions may be selected so as to keep the rate of change (e.g., across successive renderings/generations of the GUI) in the appearance and positioning of components across the GUI under predetermined thresholds. Specifically, by changing component positions and appearance slowly, rather than abruptly, components may be easier for the user to find, thus improving the user experience of the GUI. Accordingly, prior visual formats and prior positions of each dynamically-determined component may be tracked over time. The positions and visual formats of the dynamically-determined components may also be based on one or more of the inputs used by the machine learning model in determining the components.

Thus, rather than having the user adapt to or manually predetermine the GUI, the GUI may instead be automatically modified to adapt the GUI to the user's attributes and context. The GUI may thus allow resources to be dynamically routed to the user, rather than the user having to search one or more GUI for information that might be useful and/or relevant to the user.

In one example, one or more predetermined components of the first plurality of predetermined components may be a navigational component, such as a tab or button of a toolbar. Selection of the navigational component may cause display of a panel, overlay, or other section of the GUI. The panel, overlay, or other GUI section may be populated by the components determined by the machine learning model. Thus, the dynamically-determined components may form a subset of the one or more predetermined components. In another example, one or more of the dynamically-determined components may be used to replace one or more of the predetermined components, such as a predetermined component that the user has not used and/or has used infrequently. In a further example, the dynamically-determined components might be determined independently of the first plurality of predetermined components. Specifically, the first plurality of predetermined components and the dynamically-determined components may occupy mutually exclusive portions of the GUI and might not depend on one another.

Accordingly, a first example embodiment may involve receiving, from a client device, a request for rendering of a graphical user interface. The request may be associated with a user identifier. The first example embodiment may also involve obtaining, based on receiving the request and from persistent storage, a framework definition that specifies a first plurality of predetermined components of the graphical user interface and a layout of the first plurality of predetermined components within the graphical user interface. The first example embodiment may additionally involve determining a second plurality of components by way of a machine learning model trained to generate the second plurality of components based on one or more attributes associated with the user identifier. The first example embodiment may yet additionally involve determining, for each respective component of the second plurality of components, (i) a corresponding visual format according to which data associated with the respective component is displayed and (ii) a corresponding position of the respective component within the graphical user interface. The first example embodiment may further involve updating the framework definition by combining the first plurality of predetermined components and the second plurality of components based on (i) the corresponding visual format determined for each respective component of the second plurality of components and (ii) the corresponding position determined for each respective component of the second plurality of components. The first example embodiment may yet further involve transmitting the framework definition as updated to the client device.

In a second example embodiment, a system may include a persistent storage containing a framework definition that specifies a first plurality of predetermined components of a graphical user interface and a layout of the first plurality of predetermined components within the graphical user interface. The system may also include a processor configured to perform operations. The operations may include receiving, from a client device, a request for rendering of the graphical user interface. The request may be associated with a user identifier. The operations may also include obtaining, based on receiving the request and from the persistent storage, the framework definition. The operations may additionally include determining a second plurality of components by way of a machine learning model trained to generate the second plurality of components based on one or more attributes associated with the user identifier. The operations may yet additionally include determining, for each respective component of the second plurality of components, (i) a corresponding visual format according to which data associated with the respective component is displayed and (ii) a corresponding position of the respective component within the graphical user interface. The operations may further include updating the framework definition by combining the first plurality of predetermined components and the second plurality of components based on (i) the corresponding visual format determined for each respective component of the second plurality of components and (ii) the corresponding position determined for each respective component of the second plurality of components. The operations may yet further include transmitting the framework definition as updated to the client device.

In a third example embodiment, an article of manufacture may include a non-transitory computer-readable medium, having stored thereon program instructions that, upon execution by a computing system, cause the computing system to perform operations in accordance with the first example embodiment and/or the second example embodiment.

In a fourth example embodiment, a computing system may include at least one processor, as well as memory and program instructions. The program instructions may be stored in the memory, and upon execution by the at least one processor, cause the computing system to perform operations in accordance with the first example embodiment and/or the second example embodiment.

In a fifth example embodiment, a system may include various means for carrying out each of the operations of the first example embodiment and/or the second example embodiment.

These, as well as other embodiments, aspects, advantages, and alternatives, will become apparent to those of ordinary skill in the art by reading the following detailed description, with reference where appropriate to the accompanying drawings. Further, this summary and other descriptions and figures provided herein are intended to illustrate embodiments by way of example only and, as such, that numerous variations are possible. For instance, structural elements and process steps can be rearranged, combined, distributed, eliminated, or otherwise changed, while remaining within the scope of the embodiments as claimed.

DETAILED DESCRIPTION

Figure 1:
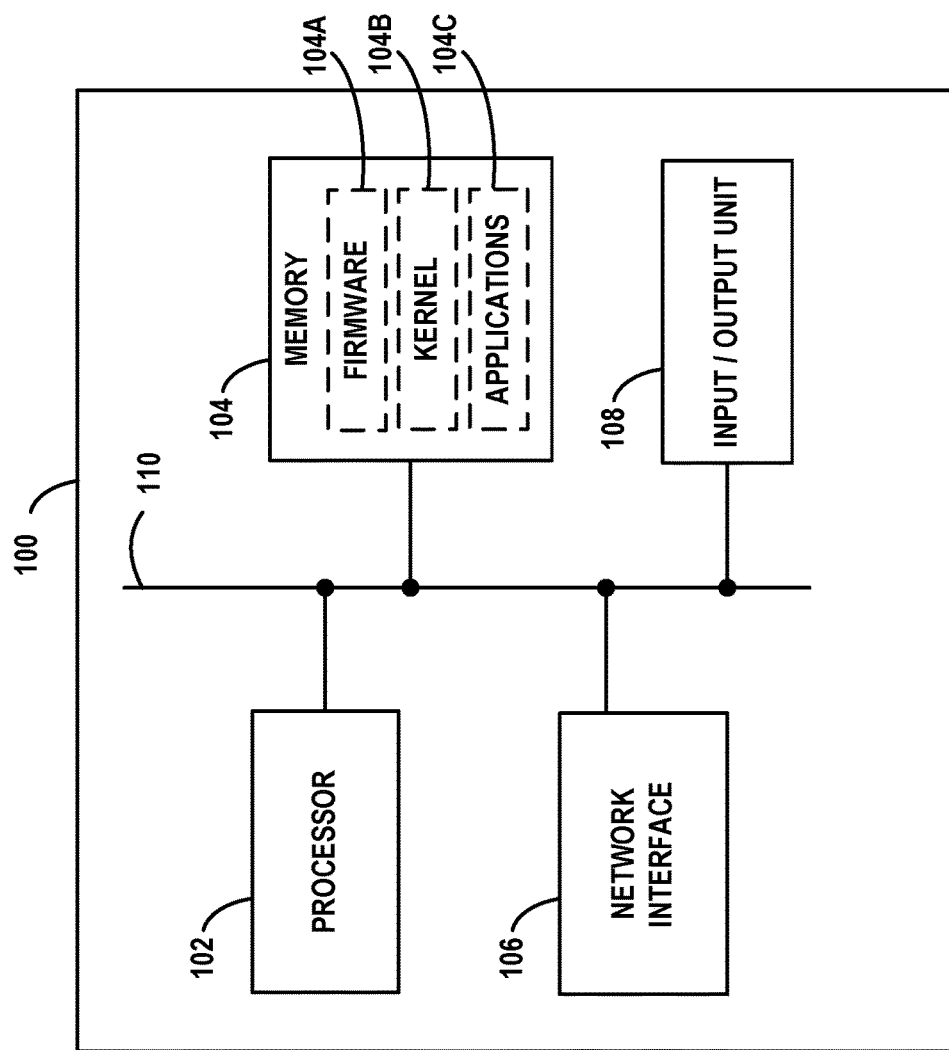
FIG. 1 illustrates a schematic drawing of a computing device, in accordance with example embodiments.

Example methods, devices, and systems are described herein. It should be understood that the words "example" and "exemplary" are used herein to mean "serving as an example, instance, or illustration." Any embodiment or feature described herein as being an "example" or "exemplary" is not necessarily to be construed as preferred or advantageous over other embodiments or features unless stated as such. Thus, other embodiments can be utilized and other changes can be made without departing from the scope of the subject matter presented herein.

Accordingly, the example embodiments described herein are not meant to be limiting. It will be readily understood that the aspects of the present disclosure, as generally described herein, and illustrated in the figures, can be arranged, substituted, combined, separated, and designed in a wide variety of different configurations. For example, the separation of features into "client" and "server" components may occur in a number of ways.

Further, unless context suggests otherwise, the features illustrated in each of the figures may be used in combination with one another. Thus, the figures should be generally viewed as component aspects of one or more overall embodiments, with the understanding that not all illustrated features are necessary for each embodiment.

Additionally, any enumeration of elements, blocks, or steps in this specification or the claims is for purposes of clarity. Thus, such enumeration should not be interpreted to require or imply that these elements, blocks, or steps adhere to a particular arrangement or are carried out in a particular order.

I. Introduction

A large enterprise is a complex entity with many interrelated operations. Some of these are found across the enterprise, such as human resources (HR), supply chain, information technology (IT), and finance. However, each enterprise also has its own unique operations that provide essential capabilities and/or create competitive advantages.

To support widely-implemented operations, enterprises typically use off-the-shelf software applications, such as customer relationship management (CRM) and human capital management (HCM) packages. However, they may also need custom software applications to meet their own unique requirements. A large enterprise often has dozens or hundreds of these custom software applications. Nonetheless, the advantages provided by the embodiments herein are not limited to large enterprises and may be applicable to an enterprise, or any other type of organization, of any size.

Many such software applications are developed by individual departments within the enterprise. These range from simple spreadsheets to custom-built software tools and databases. But the proliferation of siloed custom software applications has numerous disadvantages. It negatively impacts an enterprise's ability to run and grow its operations, innovate, and meet regulatory requirements. The enterprise may find it difficult to integrate, streamline, and enhance its operations due to lack of a single system that unifies its subsystems and data.

To efficiently create custom applications, enterprises would benefit from a remotely-hosted application platform that eliminates unnecessary development complexity. The goal of such a platform would be to reduce time-consuming, repetitive application development tasks so that software engineers and individuals in other roles can focus on developing unique, high-value features.

In order to achieve this goal, the concept of Application Platform as a Service (aPaaS) is introduced, to intelligently automate workflows throughout the enterprise. An aPaaS system is hosted remotely from the enterprise, but may access data, applications, and services within the enterprise by way of secure connections. Such an aPaaS system may have a number of advantageous capabilities and characteristics. These advantages and characteristics may be able to improve the enterprise's operations and workflows for IT, HR, CRM, customer service, application development, and security.

The aPaaS system may support development and execution of model-view-controller (MVC) applications. MVC applications divide their functionality into three interconnected parts (model, view, and controller) in order to isolate representations of information from the manner in which the information is presented to the user, thereby allowing for efficient code reuse and parallel development. These applications may be web-based, and offer create, read, update, delete (CRUD) capabilities. This allows new applications to be built on a common application infrastructure.

The aPaaS system may support standardized application components, such as a standardized set of widgets for GUI development. In this way, applications built using the aPaaS system have a common look and feel. Other software components and modules may be standardized as well. In some cases, this look and feel can be branded or skinned with an enterprise's custom logos and/or color schemes.

The aPaaS system may support the ability to configure the behavior of applications using metadata. This allows application behaviors to be rapidly adapted to meet specific needs. Such an approach reduces development time and increases flexibility. Further, the aPaaS system may support GUI tools that facilitate metadata creation and management, thus reducing errors in the metadata.

The aPaaS system may support clearly-defined interfaces between applications, so that software developers can avoid unwanted inter-application dependencies. Thus, the aPaaS system may implement a service layer in which persistent state information and other data are stored.

The aPaaS system may support a rich set of integration features so that the applications thereon can interact with legacy applications and third-party applications. For instance, the aPaaS system may support a custom employee-onboarding system that integrates with legacy HR, IT, and accounting systems.

The aPaaS system may support enterprise-grade security. Furthermore, since the aPaaS system may be remotely hosted, it should also utilize security procedures when it interacts with systems in the enterprise or third-party networks and services hosted outside of the enterprise. For example, the aPaaS system may be configured to share data amongst the enterprise and other parties to detect and identify common security threats.

Other features, functionality, and advantages of an aPaaS system may exist. This description is for purpose of example and is not intended to be limiting.

As an example of the aPaaS development process, a software developer may be tasked to create a new application using the aPaaS system. First, the developer may define the data model, which specifies the types of data that the application uses and the relationships therebetween. Then, via a GUI of the aPaaS system, the developer enters (e.g., uploads) the data model. The aPaaS system automatically creates all of the corresponding database tables, fields, and relationships, which can then be accessed via an object-oriented services layer.

In addition, the aPaaS system can also build a fully-functional MVC application with client-side interfaces and server-side CRUD logic. This generated application may serve as the basis of further development for the user. Advantageously, the developer does not have to spend a large amount of time on basic application functionality. Further, since the application may be web-based, it can be accessed from any Internet-enabled client device. Alternatively or additionally, a local copy of the application may be able to be accessed, for instance, when Internet service is not available.

The aPaaS system may also support a rich set of pre-defined functionality that can be added to applications. These features include support for searching, email, templating, workflow design, reporting, analytics, social media, scripting, mobile-friendly output, and customized GUIs.

Such an aPaaS system may represent a GUI in various ways. For example, a server device of the aPaaS system may generate a representation of a GUI using a combination of HTML and JAVASCRIPT®. The JAVASCRIPT® may include client-side executable code, server-side executable code, or both. The server device may transmit or otherwise provide this representation to a client device for the client device to display on a screen according to its locally-defined look and feel. Alternatively, a representation of a GUI may take other forms, such as an intermediate form (e.g., JAVA® byte-code) that a client device can use to directly generate graphical output therefrom. Other possibilities exist.

Further, user interaction with GUI elements, such as buttons, menus, tabs, sliders, checkboxes, toggles, etc. may be referred to as "selection", "activation", or "actuation" thereof. These terms may be used regardless of whether the GUI elements are interacted with by way of keyboard, pointing device, touchscreen, or another mechanism.

An aPaaS architecture is particularly powerful when integrated with an enterprise's network and used to manage such a network. The following embodiments describe architectural and functional aspects of example aPaaS systems, as well as the features and advantages thereof.

II. Example Computing Devices and Cloud-Based Computing Environments

FIG. 1 is a simplified block diagram exemplifying a computing device 100, illustrating some of the components that could be included in a computing device arranged to operate in accordance with the embodiments herein. Computing device 100 could be a client device (e.g., a device actively operated by a user), a server device (e.g., a device that provides computational services to client devices), or some other type of computational platform. Some server devices may operate as client devices from time to time in order to perform particular operations, and some client devices may incorporate server features.

In this example, computing device 100 includes processor 102, memory 104, network interface 106, and input/output unit 108, all of which may be coupled by system bus 110 or a similar mechanism. In some embodiments, computing device 100 may include other components and/or peripheral devices (e.g., detachable storage, printers, and so on).

Processor 102 may be one or more of any type of computer processing element, such as a central processing unit (CPU), a co-processor (e.g., a mathematics, graphics, or encryption co-processor), a digital signal processor (DSP), a network processor, and/or a form of integrated circuit or controller that performs processor operations. In some cases, processor 102 may be one or more single-core processors. In other cases, processor 102 may be one or more multi-core processors with multiple independent processing units. Processor 102 may also include register memory for temporarily storing instructions being executed and related data, as well as cache memory for temporarily storing recently-used instructions and data.

Memory 104 may be any form of computer-usable memory, including but not limited to random access memory (RAM), read-only memory (ROM), and non-volatile memory (e.g., flash memory, hard disk drives, solid state drives, compact discs (CDs), digital video discs (DVDs), and/or tape storage). Thus, memory 104 represents both main memory units, as well as long-term storage. Other types of memory may include biological memory.

Memory 104 may store program instructions and/or data on which program instructions may operate. By way of example, memory 104 may store these program instructions on a non-transitory, computer-readable medium, such that the instructions are executable by processor 102 to carry out any of the methods, processes, or operations disclosed in this specification or the accompanying drawings.

As shown in FIG. 1, memory 104 may include firmware 104A, kernel 104B, and/or applications 104C. Firmware 104A may be program code used to boot or otherwise initiate some or all of computing device 100. Kernel 104B may be an operating system, including modules for memory management, scheduling and management of processes, input/output, and communication. Kernel 104B may also include device drivers that allow the operating system to communicate with the hardware modules (e.g., memory units, networking interfaces, ports, and buses) of computing device 100. Applications 104C may be one or more userspace software programs, such as web browsers or email clients, as well as any software libraries used by these programs. Memory 104 may also store data used by these and other programs and applications.

Network interface 106 may take the form of one or more wireline interfaces, such as Ethernet (e.g., Fast Ethernet, Gigabit Ethernet, and so on). Network interface 106 may also support communication over one or more non-Ethernet media, such as coaxial cables or power lines, or over wide-area media, such as Synchronous Optical Networking (SONET) or digital subscriber line (DSL) technologies. Network interface 106 may additionally take the form of one or more wireless interfaces, such as IEEE 802.11 (Wifi), BLUETOOTH®, global positioning system (GPS), or a wide-area wireless interface. However, other forms of physical layer interfaces and other types of standard or proprietary communication protocols may be used over network interface 106. Furthermore, network interface 106 may comprise multiple physical interfaces. For instance, some embodiments of computing device 100 may include Ethernet, BLUETOOTH®, and Wifi interfaces.

Input/output unit 108 may facilitate user and peripheral device interaction with computing device 100. Input/output unit 108 may include one or more types of input devices, such as a keyboard, a mouse, a touch screen, and so on. Similarly, input/output unit 108 may include one or more types of output devices, such as a screen, monitor, printer, and/or one or more light emitting diodes (LEDs). Additionally or alternatively, computing device 100 may communicate with other devices using a universal serial bus (USB) or high-definition multimedia interface (HDMI) port interface, for example.

In some embodiments, one or more computing devices like computing device 100 may be deployed to support an aPaaS architecture. The exact physical location, connectivity, and configuration of these computing devices may be unknown and/or unimportant to client devices. Accordingly, the computing devices may be referred to as "cloud-based" devices that may be housed at various remote data center locations.

Figure 2:
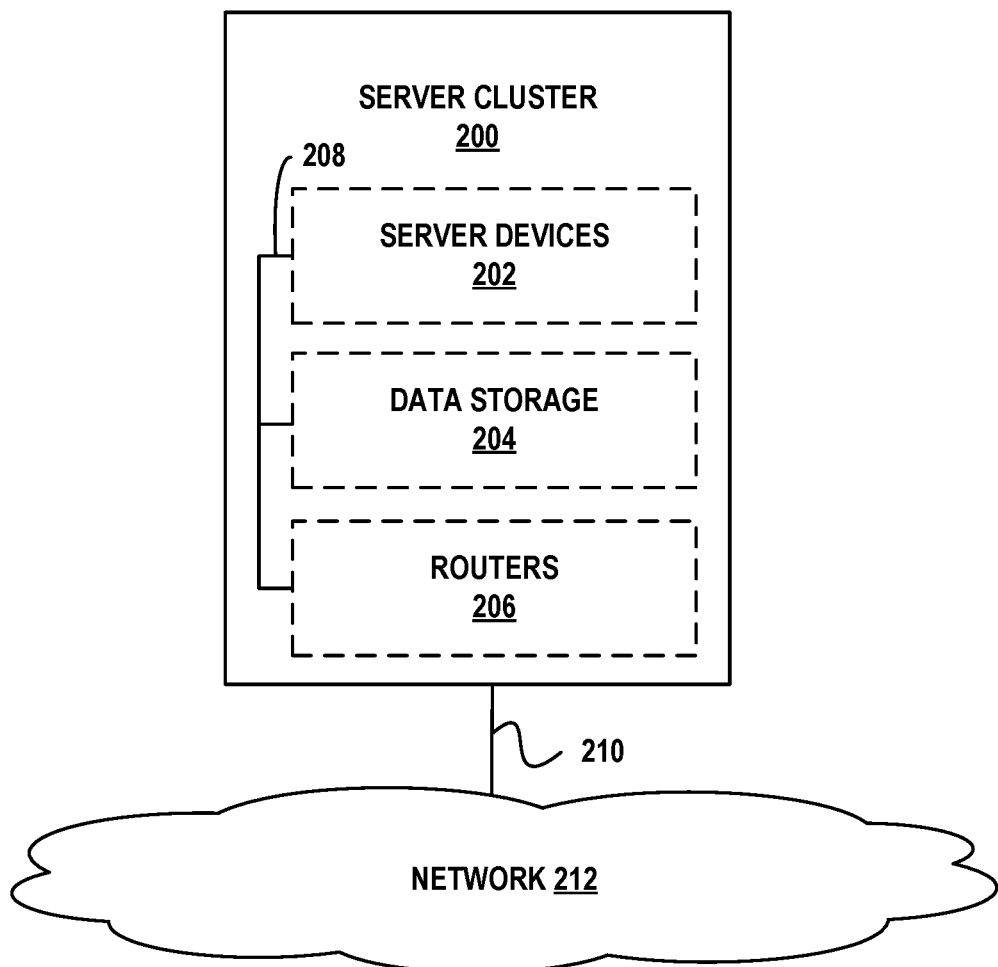
FIG. 2 illustrates a schematic drawing of a server device cluster, in accordance with example embodiments.

FIG. 2 depicts a cloud-based server cluster 200 in accordance with example embodiments. In FIG. 2, operations of a computing device (e.g., computing device 100) may be distributed between server devices 202, data storage 204, and routers 206, all of which may be connected by local cluster network 208. The number of server devices 202, data storages 204, and routers 206 in server cluster 200 may depend on the computing task(s) and/or applications assigned to server cluster 200.

For example, server devices 202 can be configured to perform various computing tasks of computing device 100. Thus, computing tasks can be distributed among one or more of server devices 202. To the extent that these computing tasks can be performed in parallel, such a distribution of tasks may reduce the total time to complete these tasks and return a result. For purposes of simplicity, both server cluster 200 and individual server devices 202 may be referred to as a "server device." This nomenclature should be understood to imply that one or more distinct server devices, data storage devices, and cluster routers may be involved in server device operations.

Data storage 204 may be data storage arrays that include drive array controllers configured to manage read and write access to groups of hard disk drives and/or solid state drives. The drive array controllers, alone or in conjunction with server devices 202, may also be configured to manage backup or redundant copies of the data stored in data storage 204 to protect against drive failures or other types of failures that prevent one or more of server devices 202 from accessing units of data storage 204. Other types of memory aside from drives may be used.

Routers 206 may include networking equipment configured to provide internal and external communications for server cluster 200. For example, routers 206 may include one or more packet-switching and/or routing devices (including switches and/or gateways) configured to provide (i) network communications between server devices 202 and data storage 204 via local cluster network 208, and/or (ii) network communications between server cluster 200 and other devices via communication link 210 to network 212.

Additionally, the configuration of routers 206 can be based at least in part on the data communication requirements of server devices 202 and data storage 204, the latency and throughput of the local cluster network 208, the latency, throughput, and cost of communication link 210, and/or other factors that may contribute to the cost, speed, fault-tolerance, resiliency, efficiency, and/or other design goals of the system architecture.

As a possible example, data storage 204 may include any form of database, such as a structured query language (SQL) database. Various types of data structures may store the information in such a database, including but not limited to tables, arrays, lists, trees, and tuples. Furthermore, any databases in data storage 204 may be monolithic or distributed across multiple physical devices.

Server devices 202 may be configured to transmit data to and receive data from data storage 204. This transmission and retrieval may take the form of SQL queries or other types of database queries, and the output of such queries, respectively. Additional text, images, video, and/or audio may be included as well. Furthermore, server devices 202 may organize the received data into web page or web application representations. Such a representation may take the form of a markup language, such as the hypertext markup language (HTML), the extensible markup language (XML), or some other standardized or proprietary format. Moreover, server devices 202 may have the capability of executing various types of computerized scripting languages, such as but not limited to Perl, Python, PHP Hypertext Preprocessor (PHP), Active Server Pages (ASP), JAVASCRIPT®, and so on. Computer program code written in these languages may facilitate the providing of web pages to client devices, as well as client device interaction with the web pages. Alternatively or additionally, JAVA® may be used to facilitate generation of web pages and/or to provide web application functionality.

III. Example Remote Network Management Architecture

Figure 3:
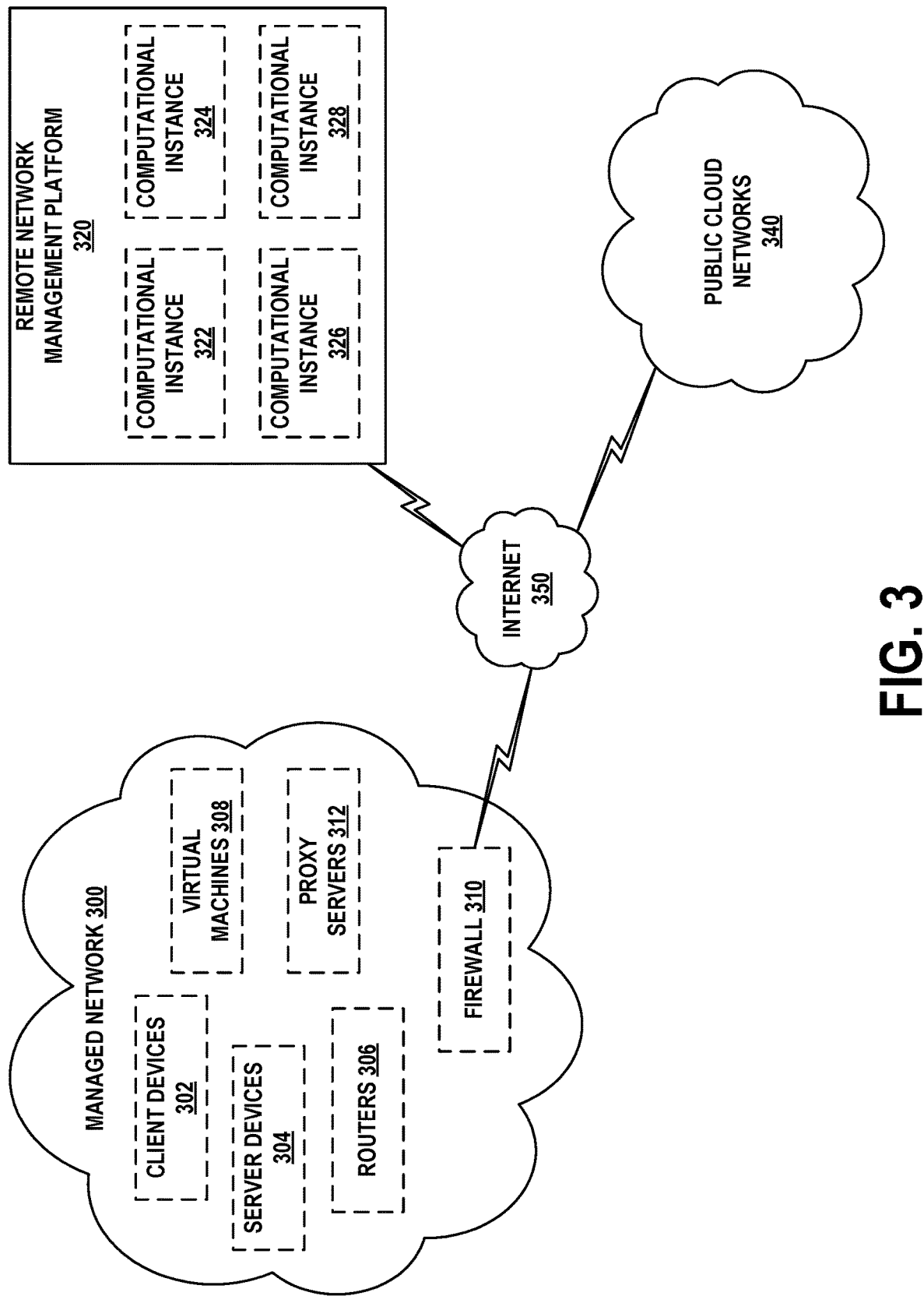
FIG. 3 depicts a remote network management architecture, in accordance with example embodiments.

FIG. 3 depicts a remote network management architecture, in accordance with example embodiments. This architecture includes three main components—managed network 300, remote network management platform 320, and public cloud networks 340—all connected by way of Internet 350.

A. Managed Networks

Managed network 300 may be, for example, an enterprise network used by an entity for computing and communications tasks, as well as storage of data. Thus, managed network 300 may include client devices 302, server devices 304, routers 306, virtual machines 308, firewall 310, and/or proxy servers 312. Client devices 302 may be embodied by computing device 100, server devices 304 may be embodied by computing device 100 or server cluster 200, and routers 306 may be any type of router, switch, or gateway.

Virtual machines 308 may be embodied by one or more of computing device 100 or server cluster 200. In general, a virtual machine is an emulation of a computing system, and mimics the functionality (e.g., processor, memory, and communication resources) of a physical computer. One physical computing system, such as server cluster 200, may support up to thousands of individual virtual machines. In some embodiments, virtual machines 308 may be managed by a centralized server device or application that facilitates allocation of physical computing resources to individual virtual machines, as well as performance and error reporting. Enterprises often employ virtual machines in order to allocate computing resources in an efficient, as needed fashion. Providers of virtualized computing systems include VMWARE® and MICROSOFT®.

Firewall 310 may be one or more specialized routers or server devices that protect managed network 300 from unauthorized attempts to access the devices, applications, and services therein, while allowing authorized communication that is initiated from managed network 300. Firewall 310 may also provide intrusion detection, web filtering, virus scanning, application-layer gateways, and other applications or services. In some embodiments not shown in FIG. 3, managed network 300 may include one or more virtual private network (VPN) gateways with which it communicates with remote network management platform 320 (see below).

Managed network 300 may also include one or more proxy servers 312. An embodiment of proxy servers 312 may be a server application that facilitates communication and movement of data between managed network 300, remote network management platform 320, and public cloud networks 340. In particular, proxy servers 312 may be able to establish and maintain secure communication sessions with one or more computational instances of remote network management platform 320. By way of such a session, remote network management platform 320 may be able to discover and manage aspects of the architecture and configuration of managed network 300 and its components. Possibly with the assistance of proxy servers 312, remote network management platform 320 may also be able to discover and manage aspects of public cloud networks 340 that are used by managed network 300.

Firewalls, such as firewall 310, typically deny all communication sessions that are incoming by way of Internet 350, unless such a session was ultimately initiated from behind the firewall (i.e., from a device on managed network 300) or the firewall has been explicitly configured to support the session. By placing proxy servers 312 behind firewall 310 (e.g., within managed network 300 and protected by firewall 310), proxy servers 312 may be able to initiate these communication sessions through firewall 310. Thus, firewall 310 might not have to be specifically configured to support incoming sessions from remote network management platform 320, thereby avoiding potential security risks to managed network 300.

In some cases, managed network 300 may consist of a few devices and a small number of networks. In other deployments, managed network 300 may span multiple physical locations and include hundreds of networks and hundreds of thousands of devices. Thus, the architecture depicted in FIG. 3 is capable of scaling up or down by orders of magnitude.

Furthermore, depending on the size, architecture, and connectivity of managed network 300, a varying number of proxy servers 312 may be deployed therein. For example, each one of proxy servers 312 may be responsible for communicating with remote network management platform 320 regarding a portion of managed network 300. Alternatively or additionally, sets of two or more proxy servers may be assigned to such a portion of managed network 300 for purposes of load balancing, redundancy, and/or high availability.

B. Remote Network Management Platforms

Remote network management platform 320 is a hosted environment that provides aPaaS services to users, particularly to the operator of managed network 300. These services may take the form of web-based portals, for example, using the aforementioned web-based technologies. Thus, a user can securely access remote network management platform 320 from, for example, client devices 302, or potentially from a client device outside of managed network 300. By way of the web-based portals, users may design, test, and deploy applications, generate reports, view analytics, and perform other tasks.

As shown in FIG. 3, remote network management platform 320 includes four computational instances 322, 324, 326, and 328. Each of these computational instances may represent one or more server nodes operating dedicated copies of the aPaaS software and/or one or more database nodes. The arrangement of server and database nodes on physical server devices and/or virtual machines can be flexible and may vary based on enterprise needs. In combination, these nodes may provide a set of web portals, services, and applications (e.g., a wholly-functioning aPaaS system) available to a particular enterprise. In some cases, a single enterprise may use multiple computational instances.

For example, managed network 300 may be an enterprise customer of remote network management platform 320, and may use computational instances 322, 324, and 326. The reason for providing multiple computational instances to one customer is that the customer may wish to independently develop, test, and deploy its applications and services. Thus, computational instance 322 may be dedicated to application development related to managed network 300, computational instance 324 may be dedicated to testing these applications, and computational instance 326 may be dedicated to the live operation of tested applications and services. A computational instance may also be referred to as a hosted instance, a remote instance, a customer instance, or by some other designation. Any application deployed onto a computational instance may be a scoped application, in that its access to databases within the computational instance can be restricted to certain elements therein (e.g., one or more particular database tables or particular rows within one or more database tables).

For purposes of clarity, the disclosure herein refers to the arrangement of application nodes, database nodes, aPaaS software executing thereon, and underlying hardware as a "computational instance." Note that users may colloquially refer to the graphical user interfaces provided thereby as "instances." But unless it is defined otherwise herein, a "computational instance" is a computing system disposed within remote network management platform 320.

The multi-instance architecture of remote network management platform 320 is in contrast to conventional multi-tenant architectures, over which multi-instance architectures exhibit several advantages. In multi-tenant architectures, data from different customers (e.g., enterprises) are comingled in a single database. While these customers' data are separate from one another, the separation is enforced by the software that operates the single database. As a consequence, a security breach in this system may impact all customers' data, creating additional risk, especially for entities subject to governmental, healthcare, and/or financial regulation. Furthermore, any database operations that impact one customer will likely impact all customers sharing that database. Thus, if there is an outage due to hardware or software errors, this outage affects all such customers. Likewise, if the database is to be upgraded to meet the needs of one customer, it will be unavailable to all customers during the upgrade process. Often, such maintenance windows will be long, due to the size of the shared database.

In contrast, the multi-instance architecture provides each customer with its own database in a dedicated computing instance. This prevents comingling of customer data, and allows each instance to be independently managed. For example, when one customer's instance experiences an outage due to errors or an upgrade, other computational instances are not impacted. Maintenance down time is limited because the database only contains one customer's data. Further, the simpler design of the multi-instance architecture allows redundant copies of each customer database and instance to be deployed in a geographically diverse fashion. This facilitates high availability, where the live version of the customer's instance can be moved when faults are detected or maintenance is being performed.

In some embodiments, remote network management platform 320 may include one or more central instances, controlled by the entity that operates this platform. Like a computational instance, a central instance may include some number of application and database nodes disposed upon some number of physical server devices or virtual machines. Such a central instance may serve as a repository for specific configurations of computational instances as well as data that can be shared amongst at least some of the computational instances. For instance, definitions of common security threats that could occur on the computational instances, software packages that are commonly discovered on the computational instances, and/or an application store for applications that can be deployed to the computational instances may reside in a central instance. Computational instances may communicate with central instances by way of well-defined interfaces in order to obtain this data.

In order to support multiple computational instances in an efficient fashion, remote network management platform 320 may implement a plurality of these instances on a single hardware platform. For example, when the aPaaS system is implemented on a server cluster such as server cluster 200, it may operate virtual machines that dedicate varying amounts of computational, storage, and communication resources to instances. But full virtualization of server cluster 200 might not be necessary, and other mechanisms may be used to separate instances. In some examples, each instance may have a dedicated account and one or more dedicated databases on server cluster 200. Alternatively, a computational instance such as computational instance 322 may span multiple physical devices.

In some cases, a single server cluster of remote network management platform 320 may support multiple independent enterprises. Furthermore, as described below, remote network management platform 320 may include multiple server clusters deployed in geographically diverse data centers in order to facilitate load balancing, redundancy, and/or high availability.

C. Public Cloud Networks

Public cloud networks 340 may be remote server devices (e.g., a plurality of server clusters such as server cluster 200) that can be used for outsourced computation, data storage, communication, and service hosting operations. These servers may be virtualized (i.e., the servers may be virtual machines). Examples of public cloud networks 340 may include AMAZON WEB SERVICES® and MICROSOFT® AZURE®. Like remote network management platform 320, multiple server clusters supporting public cloud networks 340 may be deployed at geographically diverse locations for purposes of load balancing, redundancy, and/or high availability.

Managed network 300 may use one or more of public cloud networks 340 to deploy applications and services to its clients and customers. For instance, if managed network 300 provides online music streaming services, public cloud networks 340 may store the music files and provide web interface and streaming capabilities. In this way, the enterprise of managed network 300 does not have to build and maintain its own servers for these operations.

Remote network management platform 320 may include modules that integrate with public cloud networks 340 to expose virtual machines and managed services therein to managed network 300. The modules may allow users to request virtual resources, discover allocated resources, and provide flexible reporting for public cloud networks 340. In order to establish this functionality, a user from managed network 300 might first establish an account with public cloud networks 340, and request a set of associated resources. Then, the user may enter the account information into the appropriate modules of remote network management platform 320. These modules may then automatically discover the manageable resources in the account, and also provide reports related to usage, performance, and billing.

D. Communication Support and Other Operations

Internet 350 may represent a portion of the global Internet. However, Internet 350 may alternatively represent a different type of network, such as a private wide-area or local-area packet-switched network.

Figure 4:
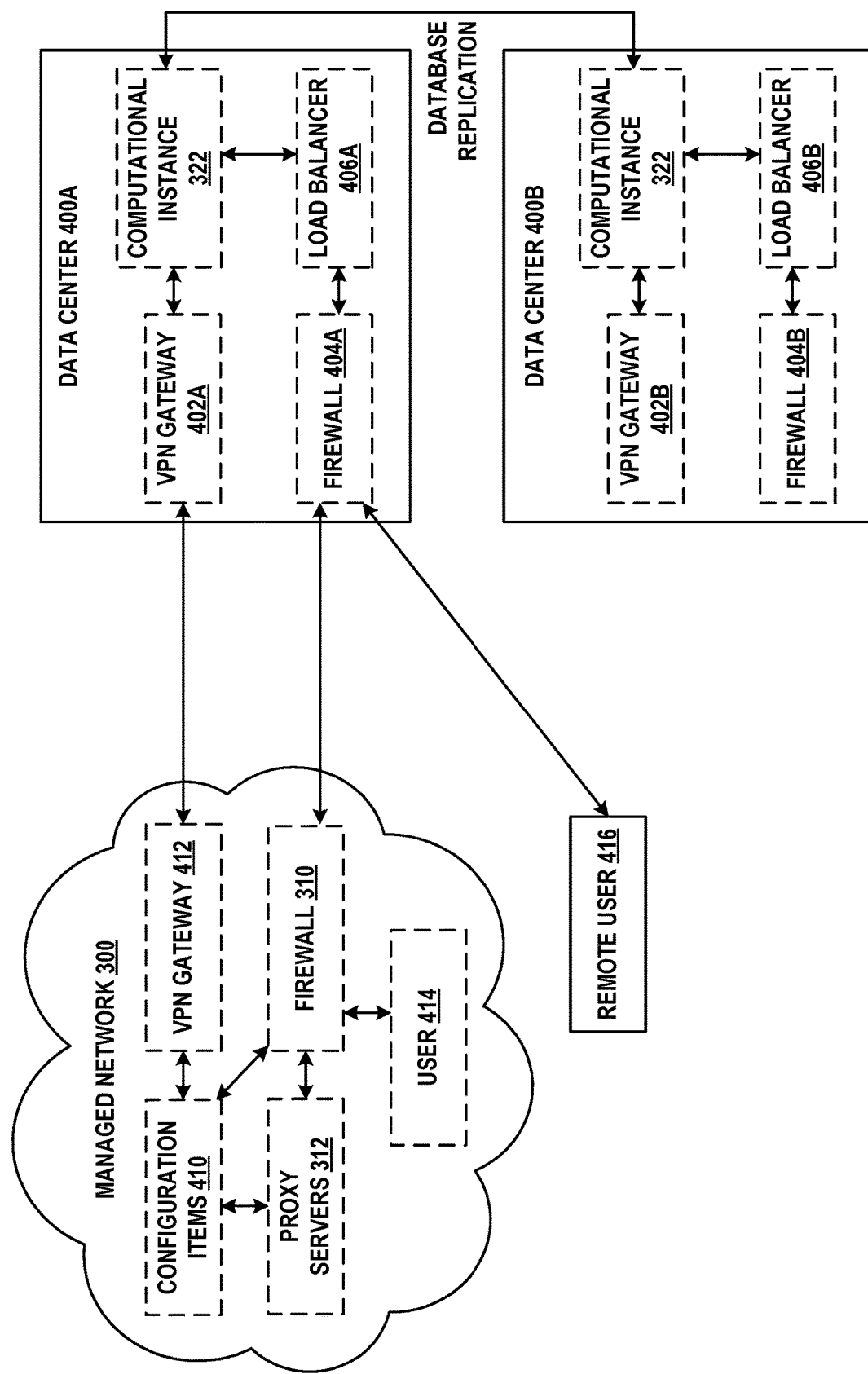
FIG. 4 depicts a communication environment involving a remote network management architecture, in accordance with example embodiments.

FIG. 4 further illustrates the communication environment between managed network 300 and computational instance 322, and introduces additional features and alternative embodiments. In FIG. 4, computational instance 322 is replicated across data centers 400A and 400B. These data centers may be geographically distant from one another, perhaps in different cities or different countries. Each data center includes support equipment that facilitates communication with managed network 300, as well as remote users.

In data center 400A, network traffic to and from external devices flows either through VPN gateway 402A or firewall 404A. VPN gateway 402A may be peered with VPN gateway 412 of managed network 300 by way of a security protocol such as Internet Protocol Security (IPSEC) or Transport Layer Security (TLS). Firewall 404A may be configured to allow access from authorized users, such as user 414 and remote user 416, and to deny access to unauthorized users. By way of firewall 404A, these users may access computational instance 322, and possibly other computational instances. Load balancer 406A may be used to distribute traffic amongst one or more physical or virtual server devices that host computational instance 322. Load balancer 406A may simplify user access by hiding the internal configuration of data center 400A, (e.g., computational instance 322) from client devices. For instance, if computational instance 322 includes multiple physical or virtual computing devices that share access to multiple databases, load balancer 406A may distribute network traffic and processing tasks across these computing devices and databases so that no one computing device or database is significantly busier than the others. In some embodiments, computational instance 322 may include VPN gateway 402A, firewall 404A, and load balancer 406A.

Data center 400B may include its own versions of the components in data center 400A. Thus, VPN gateway 402B, firewall 404B, and load balancer 406B may perform the same or similar operations as VPN gateway 402A, firewall 404A, and load balancer 406A, respectively. Further, by way of real-time or near-real-time database replication and/or other operations, computational instance 322 may exist simultaneously in data centers 400A and 400B.

Data centers 400A and 400B as shown in FIG. 4 may facilitate redundancy and high availability. In the configuration of FIG. 4, data center 400A is active and data center 400B is passive. Thus, data center 400A is serving all traffic to and from managed network 300, while the version of computational instance 322 in data center 400B is being updated in near-real-time. Other configurations, such as one in which both data centers are active, may be supported.

Should data center 400A fail in some fashion or otherwise become unavailable to users, data center 400B can take over as the active data center. For example, domain name system (DNS) servers that associate a domain name of computational instance 322 with one or more Internet Protocol (IP) addresses of data center 400A may re-associate the domain name with one or more IP addresses of data center 400B. After this re-association completes (which may take less than one second or several seconds), users may access computational instance 322 by way of data center 400B.

FIG. 4 also illustrates a possible configuration of managed network 300. As noted above, proxy servers 312 and user 414 may access computational instance 322 through firewall 310. Proxy servers 312 may also access configuration items 410. In FIG. 4, configuration items 410 may refer to any or all of client devices 302, server devices 304, routers 306, and virtual machines 308, any applications or services executing thereon, as well as relationships between devices, applications, and services. Thus, the term "configuration items" may be shorthand for any physical or virtual device, or any application or service remotely discoverable or managed by computational instance 322, or relationships between discovered devices, applications, and services. Configuration items may be represented in a configuration management database (CMDB) of computational instance 322.

As noted above, VPN gateway 412 may provide a dedicated VPN to VPN gateway 402A. Such a VPN may be helpful when there is a significant amount of traffic between managed network 300 and computational instance 322, or security policies otherwise suggest or require use of a VPN between these sites. In some embodiments, any device in managed network 300 and/or computational instance 322 that directly communicates via the VPN is assigned a public IP address. Other devices in managed network 300 and/or computational instance 322 may be assigned private IP addresses (e.g., IP addresses selected from the 10.0.0.0-10.255.255.255 or 192.168.0.0-192.168.255.255 ranges, represented in shorthand as subnets 10.0.0.0/8 and 192.168.0.0/16, respectively).

IV. Example Device, Application, and Service Discovery

In order for remote network management platform 320 to administer the devices, applications, and services of managed network 300, remote network management platform 320 may first determine what devices are present in managed network 300, the configurations and operational statuses of these devices, and the applications and services provided by the devices, as well as the relationships between discovered devices, applications, and services. As noted above, each device, application, service, and relationship may be referred to as a configuration item. The process of defining configuration items within managed network 300 is referred to as discovery, and may be facilitated at least in part by proxy servers 312.

For purposes of the embodiments herein, an "application" may refer to one or more processes, threads, programs, client modules, server modules, or any other software that executes on a device or group of devices. A "service" may refer to a high-level capability provided by multiple applications executing on one or more devices working in conjunction with one another. For example, a high-level web service may involve multiple web application server threads executing on one device and accessing information from a database application that executes on another device.

Figure 5A:
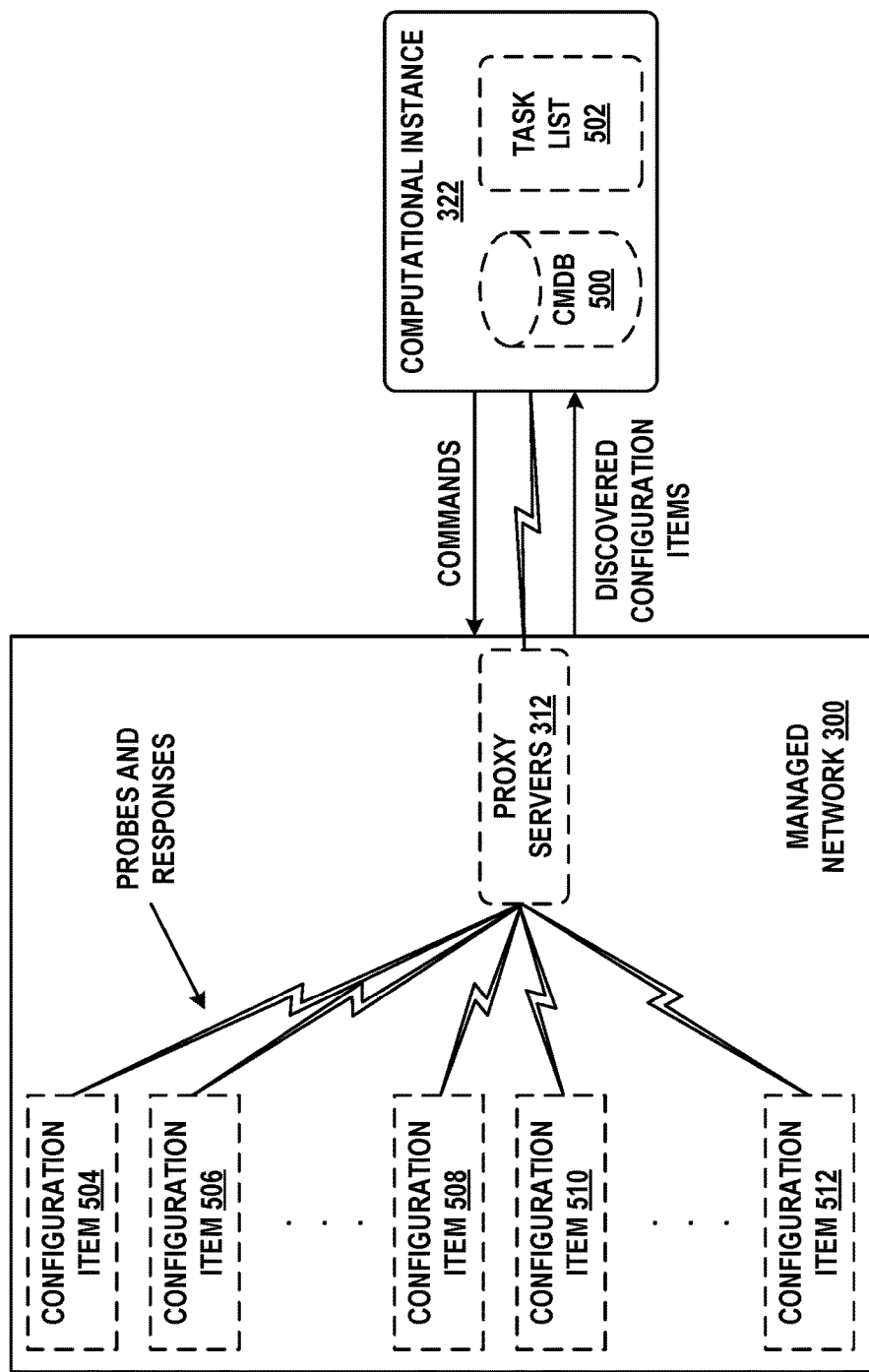
FIG. 5A depicts another communication environment involving a remote network management architecture, in accordance with example embodiments.

FIG. 5A provides a logical depiction of how configuration items can be discovered, as well as how information related to discovered configuration items can be stored. For sake of simplicity, remote network management platform 320, public cloud networks 340, and Internet 350 are not shown.

In FIG. 5A, CMDB 500 and task list 502 are stored within computational instance 322. Computational instance 322 may transmit discovery commands to proxy servers 312. In response, proxy servers 312 may transmit probes to various devices, applications, and services in managed network 300. These devices, applications, and services may transmit responses to proxy servers 312, and proxy servers 312 may then provide information regarding discovered configuration items to CMDB 500 for storage therein. Configuration items stored in CMDB 500 represent the environment of managed network 300.

Task list 502 represents a list of activities that proxy servers 312 are to perform on behalf of computational instance 322. As discovery takes place, task list 502 is populated. Proxy servers 312 repeatedly query task list 502, obtain the next task therein, and perform this task until task list 502 is empty or another stopping condition has been reached.

To facilitate discovery, proxy servers 312 may be configured with information regarding one or more subnets in managed network 300 that are reachable by way of proxy servers 312. For instance, proxy servers 312 may be given the IP address range 192.168.0/24 as a subnet. Then, computational instance 322 may store this information in CMDB 500 and place tasks in task list 502 for discovery of devices at each of these addresses.

FIG. 5A also depicts devices, applications, and services in managed network 300 as configuration items 504, 506, 508, 510, and 512. As noted above, these configuration items represent a set of physical and/or virtual devices (e.g., client devices, server devices, routers, or virtual machines), applications executing thereon (e.g., web servers, email servers, databases, or storage arrays), relationships therebetween, as well as services that involve multiple individual configuration items.

Placing the tasks in task list 502 may trigger or otherwise cause proxy servers 312 to begin discovery. Alternatively or additionally, discovery may be manually triggered or automatically triggered based on triggering events (e.g., discovery may automatically begin once per day at a particular time).

In general, discovery may proceed in four logical phases: scanning, classification, identification, and exploration. Each phase of discovery involves various types of probe messages being transmitted by proxy servers 312 to one or more devices in managed network 300. The responses to these probes may be received and processed by proxy servers 312, and representations thereof may be transmitted to CMDB 500. Thus, each phase can result in more configuration items being discovered and stored in CMDB 500.

In the scanning phase, proxy servers 312 may probe each IP address in the specified range of IP addresses for open Transmission Control Protocol (TCP) and/or User Datagram Protocol (UDP) ports to determine the general type of device. The presence of such open ports at an IP address may indicate that a particular application is operating on the device that is assigned the IP address, which in turn may identify the operating system used by the device. For example, if TCP port 135 is open, then the device is likely executing a WINDOWS® operating system. Similarly, if TCP port 22 is open, then the device is likely executing a UNIX® operating system, such as LINUX®. If UDP port 161 is open, then the device may be able to be further identified through the Simple Network Management Protocol (SNMP). Other possibilities exist. Once the presence of a device at a particular IP address and its open ports have been discovered, these configuration items are saved in CMDB 500.

In the classification phase, proxy servers 312 may further probe each discovered device to determine the version of its operating system. The probes used for a particular device are based on information gathered about the devices during the scanning phase. For example, if a device is found with TCP port 22 open, a set of UNIX®-specific probes may be used. Likewise, if a device is found with TCP port 135 open, a set of WINDOWS®-specific probes may be used. For either case, an appropriate set of tasks may be placed in task list 502 for proxy servers 312 to carry out. These tasks may result in proxy servers 312 logging on, or otherwise accessing information from the particular device. For instance, if TCP port 22 is open, proxy servers 312 may be instructed to initiate a Secure Shell (SSH) connection to the particular device and obtain information about the operating system thereon from particular locations in the file system. Based on this information, the operating system may be determined. As an example, a UNIX® device with TCP port 22 open may be classified as AIX®, HPUX, LINUX®, MACOS®, or SOLARIS®. This classification information may be stored as one or more configuration items in CMDB 500.

In the identification phase, proxy servers 312 may determine specific details about a classified device. The probes used during this phase may be based on information gathered about the particular devices during the classification phase. For example, if a device was classified as LINUX®, a set of LINUX®-specific probes may be used. Likewise, if a device was classified as WINDOWS® 2012, as a set of WINDOWS®-2012-specific probes may be used. As was the case for the classification phase, an appropriate set of tasks may be placed in task list 502 for proxy servers 312 to carry out. These tasks may result in proxy servers 312 reading information from the particular device, such as basic input/output system (BIOS) information, serial numbers, network interface information, media access control address(es) assigned to these network interface(s), IP address(es) used by the particular device and so on. This identification information may be stored as one or more configuration items in CMDB 500.

In the exploration phase, proxy servers 312 may determine further details about the operational state of a classified device. The probes used during this phase may be based on information gathered about the particular devices during the classification phase and/or the identification phase. Again, an appropriate set of tasks may be placed in task list 502 for proxy servers 312 to carry out. These tasks may result in proxy servers 312 reading additional information from the particular device, such as processor information, memory information, lists of running processes (applications), and so on. Once more, the discovered information may be stored as one or more configuration items in CMDB 500.

Running discovery on a network device, such as a router, may utilize SNMP. Instead of or in addition to determining a list of running processes or other application-related information, discovery may determine additional subnets known to the router and the operational state of the router's network interfaces (e.g., active, inactive, queue length, number of packets dropped, etc.). The IP addresses of the additional subnets may be candidates for further discovery procedures. Thus, discovery may progress iteratively or recursively.

Once discovery completes, a snapshot representation of each discovered device, application, and service is available in CMDB 500. For example, after discovery, operating system version, hardware configuration, and network configuration details for client devices, server devices, and routers in managed network 300, as well as applications executing thereon, may be stored. This collected information may be presented to a user in various ways to allow the user to view the hardware composition and operational status of devices, as well as the characteristics of services that span multiple devices and applications.

Furthermore, CMDB 500 may include entries regarding dependencies and relationships between configuration items. More specifically, an application that is executing on a particular server device, as well as the services that rely on this application, may be represented as such in CMDB 500. For example, suppose that a database application is executing on a server device, and that this database application is used by a new employee onboarding service as well as a payroll service. Thus, if the server device is taken out of operation for maintenance, it is clear that the employee onboarding service and payroll service will be impacted. Likewise, the dependencies and relationships between configuration items may be able to represent the services impacted when a particular router fails.

In general, dependencies and relationships between configuration items may be displayed on a web-based interface and represented in a hierarchical fashion. Thus, adding, changing, or removing such dependencies and relationships may be accomplished by way of this interface.

Furthermore, users from managed network 300 may develop workflows that allow certain coordinated activities to take place across multiple discovered devices. For instance, an IT workflow might allow the user to change the common administrator password to all discovered LINUX® devices in a single operation.

In order for discovery to take place in the manner described above, proxy servers 312, CMDB 500, and/or one or more credential stores may be configured with credentials for one or more of the devices to be discovered. Credentials may include any type of information needed in order to access the devices. These may include userid/password pairs, certificates, and so on. In some embodiments, these credentials may be stored in encrypted fields of CMDB 500. Proxy servers 312 may contain the decryption key for the credentials so that proxy servers 312 can use these credentials to log on to or otherwise access devices being discovered.

Figure 5B:
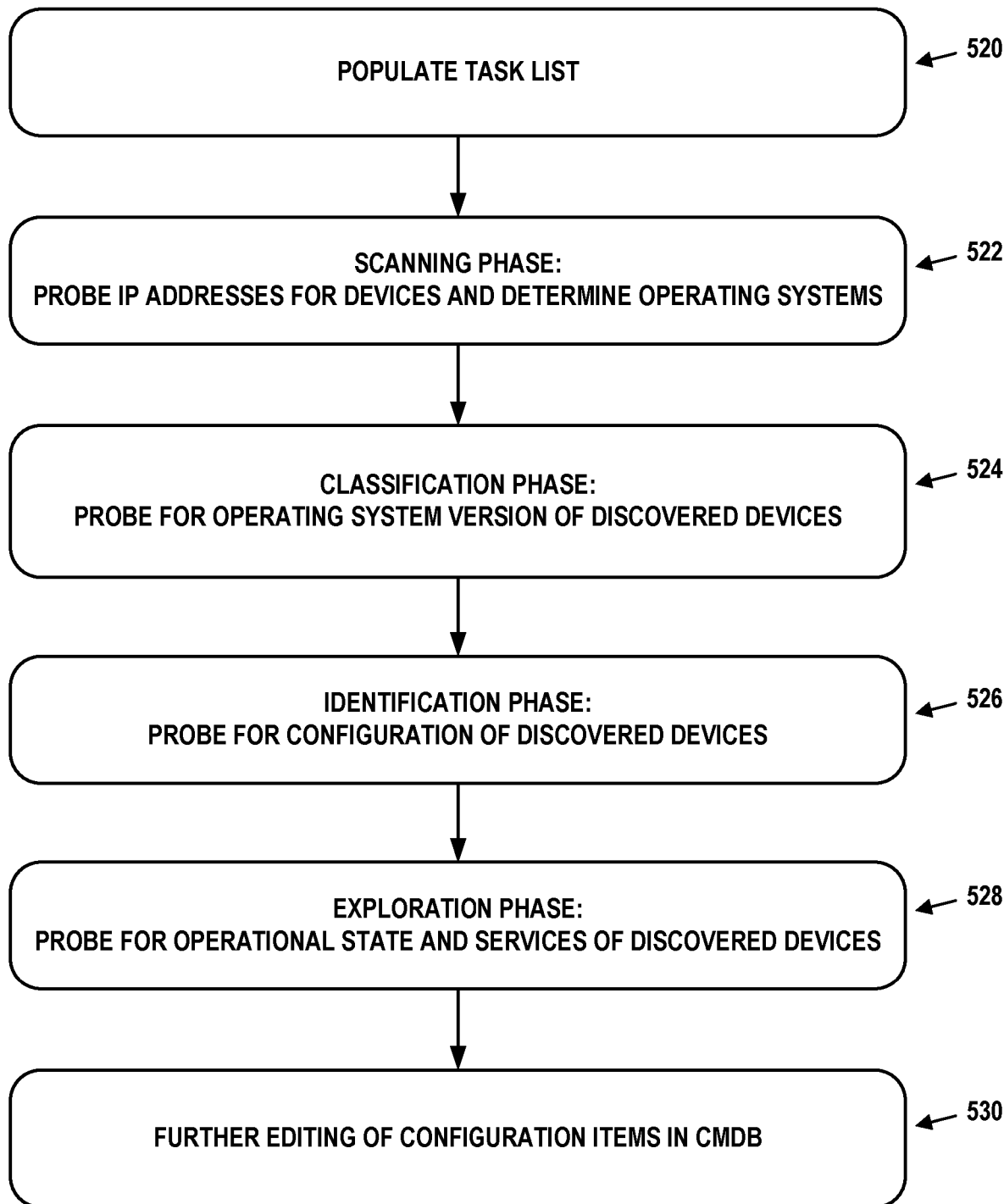
FIG. 5B is a flow chart, in accordance with example embodiments.

The discovery process is depicted as a flow chart in FIG. 5B. At block 520, the task list in the computational instance is populated, for instance, with a range of IP addresses. At block 522, the scanning phase takes place. Thus, the proxy servers probe the IP addresses for devices using these IP addresses, and attempt to determine the operating systems that are executing on these devices. At block 524, the classification phase takes place. The proxy servers attempt to determine the operating system version of the discovered devices. At block 526, the identification phase takes place. The proxy servers attempt to determine the hardware and/or software configuration of the discovered devices. At block 528, the exploration phase takes place. The proxy servers attempt to determine the operational state and applications executing on the discovered devices. At block 530, further editing of the configuration items representing the discovered devices and applications may take place. This editing may be automated and/or manual in nature.

The blocks represented in FIG. 5B are examples. Discovery may be a highly configurable procedure that can have more or fewer phases, and the operations of each phase may vary. In some cases, one or more phases may be customized, or may otherwise deviate from the exemplary descriptions above.

In this manner, a remote network management platform may discover and inventory the hardware, software, and services deployed on and provided by the managed network. As noted above, this data may be stored in a CMDB of the associated computational instance as configuration items. For example, individual hardware components (e.g., computing devices, virtual servers, databases, routers, etc.) may be represented as hardware configuration items, while the applications installed and/or executing thereon may be represented as software configuration items.

The relationship between a software configuration item installed or executing on a hardware configuration item may take various forms, such as "is hosted on", "runs on", or "depends on". Thus, a database application installed on a server device may have the relationship "is hosted on" with the server device to indicate that the database application is hosted on the server device. In some embodiments, the server device may have a reciprocal relationship of "used by" with the database application to indicate that the server device is used by the database application. These relationships may be automatically found using the discovery procedures described above, though it is possible to manually set relationships as well.

The relationship between a service and one or more software configuration items may also take various forms. As an example, a web service may include a web server software configuration item and a database application software configuration item, each installed on different hardware configuration items. The web service may have a "depends on" relationship with both of these software configuration items, while the software configuration items have a "used by" reciprocal relationship with the web service. Services might not be able to be fully determined by discovery procedures, and instead may rely on service mapping (e.g., probing configuration files and/or carrying out network traffic analysis to determine service level relationships between configuration items) and possibly some extent of manual configuration.

Regardless of how relationship information is obtained, it can be valuable for the operation of a managed network. Notably, IT personnel can quickly determine where certain software applications are deployed, and what configuration items make up a service. This allows for rapid pinpointing of root causes of service outages or degradation. For example, if two different services are suffering from slow response times, the CMDB can be queried (perhaps among other activities) to determine that the root cause is a database application that is used by both services having high processor utilization. Thus, IT personnel can address the database application rather than waste time considering the health and performance of other configuration items that make up the services.

V. Example User Interface Generation

Predefined user interfaces provide constancy in the user experience over time and/or across multiple users by displaying user interface components, which may sometimes be referred to as user interface elements, according to a particular layout. In some cases, the predefined user interfaces may be static in that the components and their layout might not be modifiable, and thus might not allow user-specific customizations. In other cases, the predefined user interfaces may be modifiable, allowing for user-specific adjustments to the components and their layout. In either case, however, the predefined user interface might not be configured to automatically adapt itself to user-specific behaviors, the data to be displayed, and/or contextual information. For example, unless the user interface is manually modified by the user and/or a programmer, it may continue to display the same components according to the same layout even as attributes associated with a user, with the data to be displayed, and/or with the context change over time. Accordingly, provided herein are various approaches for generating GUIs based on user attributes, data attributes, and/or other contextual factors/attributes that may vary over time and/or across different users.

Figure 6:
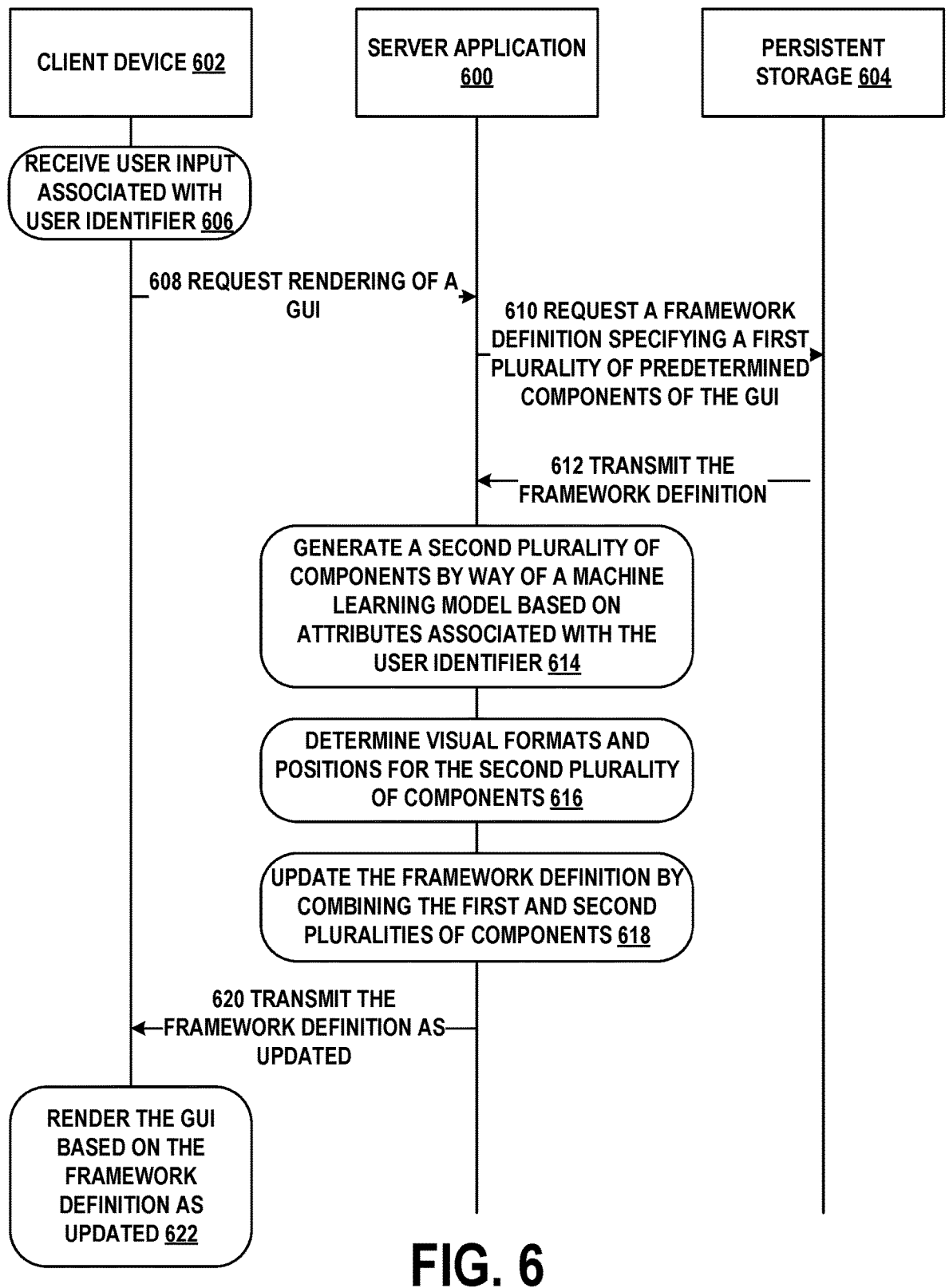
FIG. 6 is a message flow diagram, in accordance with example embodiments.

FIG. 6 illustrates a message flow diagram of operations related to generating user-specific graphical user interfaces. Specifically, FIG. 6 illustrates server application 600, client device 602, and persistent storage 604. Server application 600 may be configured to generate one or more graphical user interfaces (GUIs) by way of which client device 602 is able to interact with various resources, such as software applications, webpages, files, and/or other information. Aspects of the various resources exposed via the GUI may be stored in persistent storage 604 and/or executed/provided by server application 600. In some implementations, server application 600 and/or persistent storage 604 may be disposed within computational instance 322. Persistent storage 604 may represent, for example, CMDB 500 or some other database.

Client device 602 may be a user device, such as a desktop computer, table computer, smartphone, and/or other computing device, through which a user may interact with the GUI and/or the resources provided by server application 600. Client device 602 may, for example, be disposed within managed network 300. Client device 602 may be configured to receive user input associated with a user identifier, as indicate by block 606. The user input may take the form of the user specifying a uniform resource location (URL), and/or actuating a user interface component (e.g., a button, card, or widget), among other possibilities.

The user identifier may take the form of a session token/identifier (e.g., a session cookie) which may have been provided to client device 602 by server application 600 based on and/or in response to successful authentication by client device 602. For example, the user identifier may be provided to client device 602 by server application 600 based on a username and password provided to server application 600 via client device 602. The user identifier may thus be associated with information maintained by server application 600 and/or persistent storage 604 in connection with the username, such as one or more user attributes, among other possible information.

The user input may include a request the rendering of a GUI. For example, the GUI may be associated with a particular software application and/or webpage provided by server application 600. Accordingly, based on or in response to reception of the user input at block 606, client device 602 may be configured to transmit, to server application 600, a request for rendering of the GUI, as indicated by arrow 608. For example, the request at arrow 608 may take the form of a hypertext transfer protocol (HTTP) request or an asynchronous JAVASCRIPT® request, among other possibilities.

Based on or in response to reception of the request at arrow 608, server application 600 may be configured to transmit, to persistent storage 604, a request for a framework definition, as indicate by arrow 610. The framework definition may specify a first plurality of predetermined components of the GUI, as well as a layout of the first plurality of predetermined components within the GUI. In some implementations, the framework definition may also specify visual formats for the first plurality of predetermined components.

Each predetermined component may correspond to, represent, and/or provide a way of interacting with one or more resources provided by server application 600 and/or persistent storage 604. In practice, the framework definition may be represented, for example, by one or more files defining the predetermined components by way of a markup language, such as hypertext markup language (HTML), a style language that defines the visual appearance of the predetermined components, such as cascading style sheets (CSS), and/or a scripting language that defines the behavior of the predetermined components, such as JAVASCRIPT®, among others.

Based on or in response to reception of the request at arrow 610, persistent storage 604 may be configured to transmit, to server application 600, the framework definition, as indicated by arrow 612. In some cases, the transmission at arrow 612 may also include the data to be displayed by way of the first plurality of predetermined components of the GUI. For example, the data to be displayed may be retrieved from persistent storage 604 based on additional (e.g., user-specific) information included in request 610, and may be included as part of transmission 612. In some cases, the data to be displayed may be stored in persistent storage 604 independently of the definitions of the first plurality of predetermined components. Thus, server application 600 may be configured to combine the data with the framework definition to generate the predefined components as they will appear to the user.

The first plurality of predetermined components may represent aspects of the user interface that remain consistent across users and/or over time. While the specific data displayed by the first plurality of predetermined components may change over time, the layout and appearance of the first plurality of predetermined components may remain constant until these components are manually modified by, for example, the user, an administrator, and/or a programmer. Thus, the first plurality of predetermined components may provide consistency in the user experience provided by the GUI.

Based on or in response to reception of the framework definition at arrow 612, server application 600 may be configured to generate a second plurality of components for the GUI by way of a machine learning model, as indicated by block 614. Specifically, the machine learning model may be trained (e.g., based on training data and via various backpropagation and gradient descent techniques) to generate the second plurality of components based on attributes associated with the user identifier. In some cases, the machine learning model may also be trained to generate the second plurality of components based on other attributes, such as attributes of candidate data to be displayed by way of the second plurality of components, attributes of a particular predetermined component, and/or attributes associated with other users belonging to the same group as the user identifier specified at block 606. Thus, in order to obtain input data for the machine learning model, server application 600 may be configured to make additional requests for data from persistent storage 604, or may be configured to obtain this data as part of the operations of arrows 610 and 612. An example machine learning model is illustrated in and discussed in more detail with respect to FIG. 7.

Figure 8A:
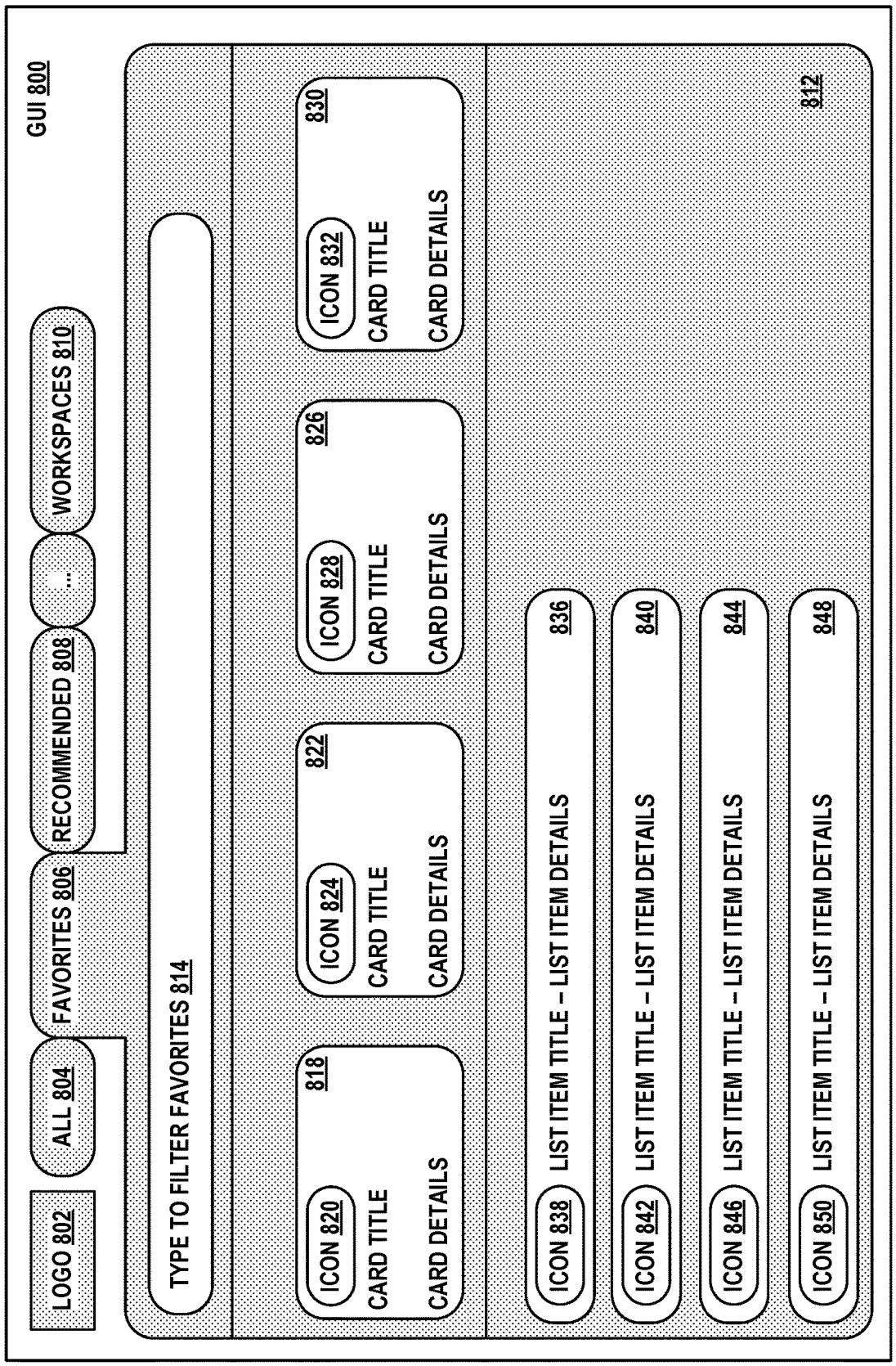
FIG. 8A, 8B, and 8C illustrate aspects of a graphical user interface, in accordance with example embodiments.
Figure 8B:
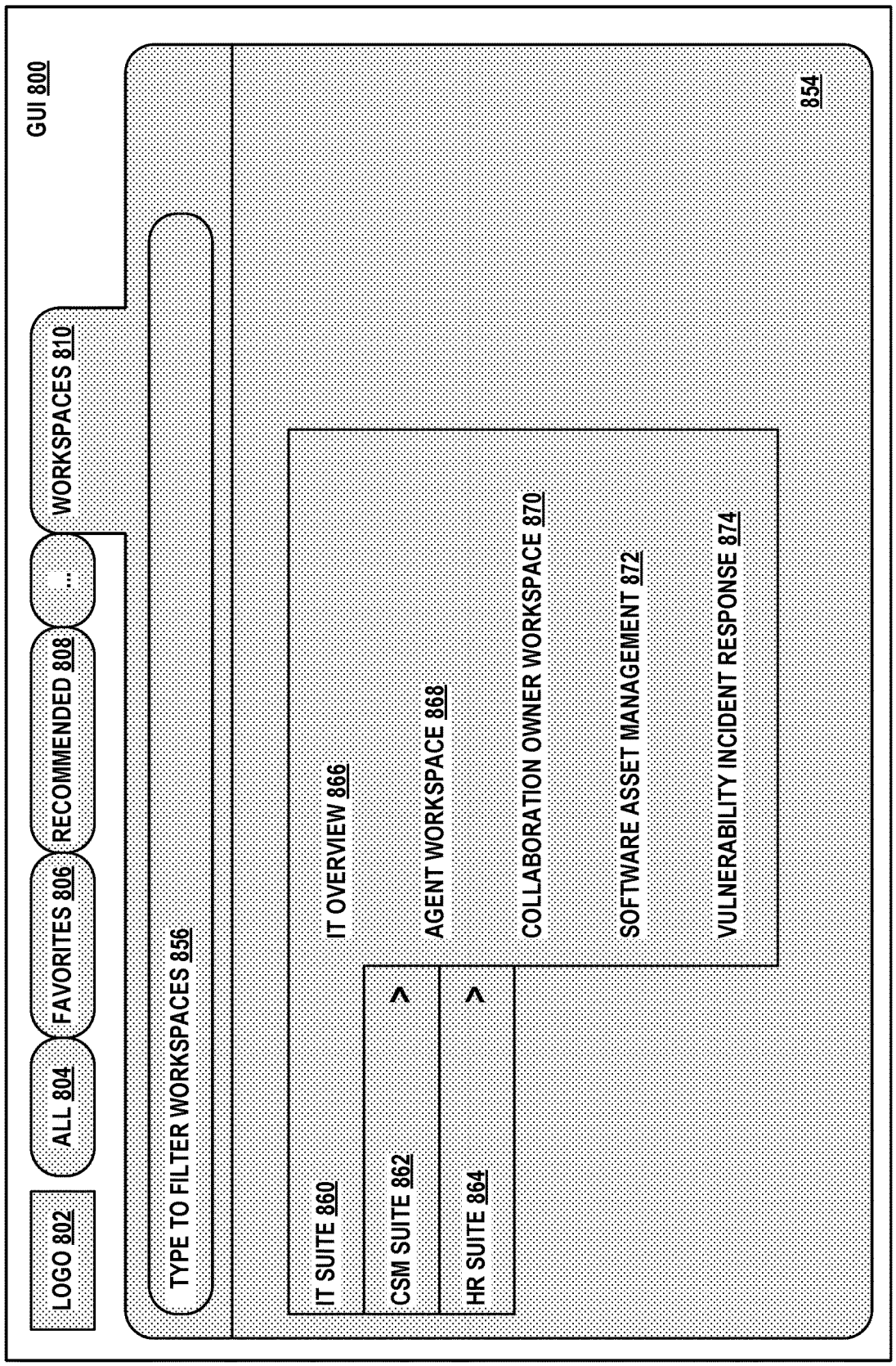
Figure 8C:
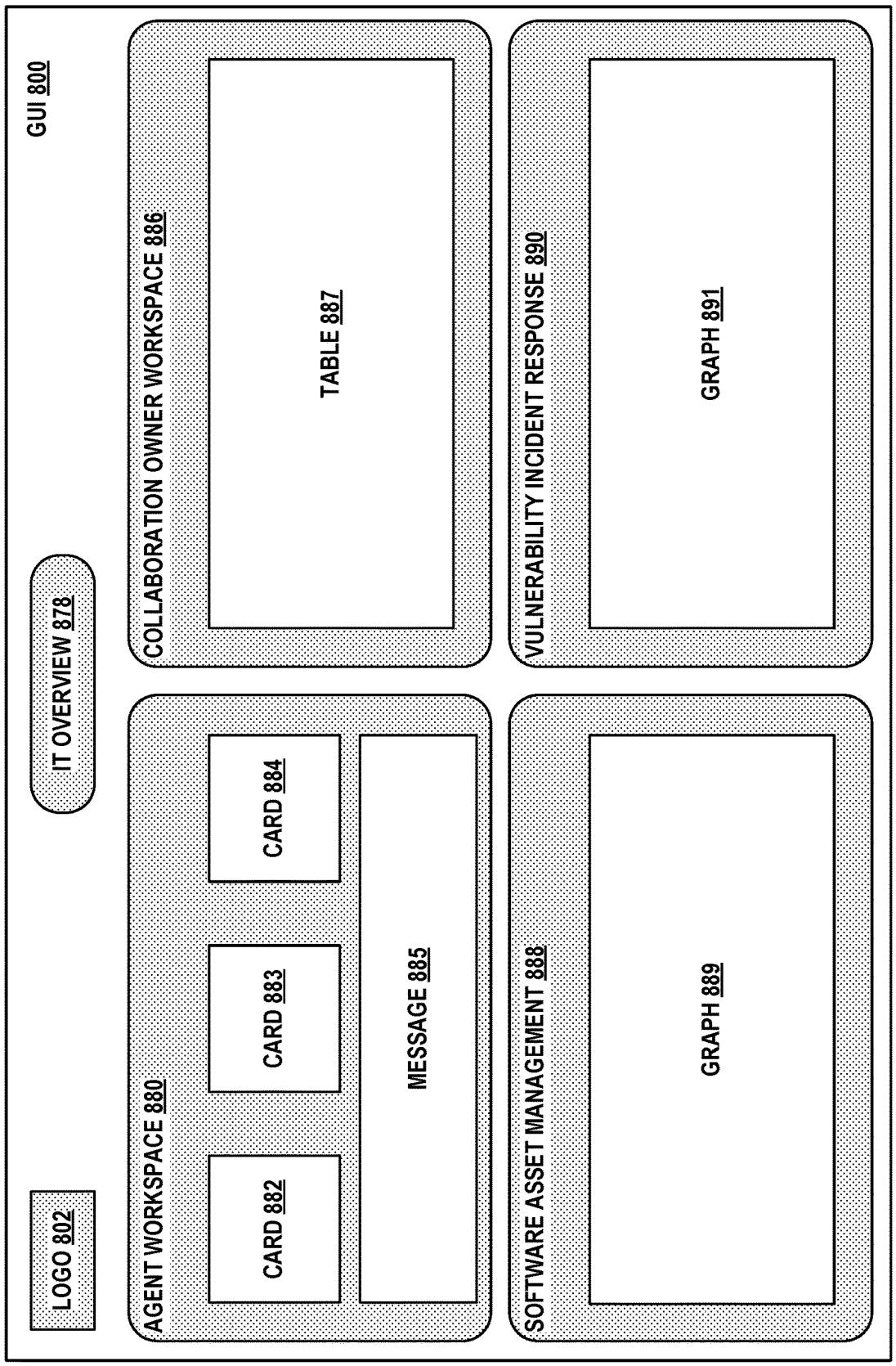

Much like the first plurality of predetermined components, the second plurality of components may represent resources provided by server application 600 and/or persistent storage 604. Unlike the first plurality of predetermined components, however, the second plurality of components may be dynamically-determined and thus able to adapt to changes in the attributes associated with the user identifier, attributes associated with the candidate data, and/or other attributes/factors. Specifically, unlike the first plurality of predetermined components, which may remain consistent unless manually modified, the second plurality of components may automatically change based on changes in user behavior, the candidate data, and/or other attributes/factors. The second plurality of components thus allows the GUI to automatically provide each respective user with references to software applications, webpages, files, and/or other resources that are relevant to the respective user (but which might not be as relevant to some other users). Examples of the first plurality of predetermined components and the second plurality of components are illustrated in FIGS. 8A, 8B, and 8C.

In some implementations, users and/or administrators may be able to determine whether a particular component is predetermined or is configured to be dynamically-determined as part of the GUI. For example, the first plurality of predetermined components may be designated by an administrator of managed network 300 for inclusion in all instantiations/definitions of a particular GUI, thus providing all users associated with managed network 300 a sense of constancy/familiarity in the user experience with the particular GUI. Any components not explicitly designated as predetermined may be included or excluded from instantiations of the particular GUI based on the output of the machine learning model.

Based on or in response to generating the second plurality of components at block 614, server application 600 may be configured to determine visual formats and positions for the second plurality of components, as indicated by block 616. Specifically, server application 600 may be configured to determine, for each respective component of the second plurality of components, a corresponding visual format and a corresponding position of the respective component within the GUI. The corresponding visual format of the respective component may be based on, for example, prior visual formats previously used for the respective component, attributes associated with the user identifier, and/or attributes associated with the data to be displayed, among other attributes/factors. The corresponding position of the respective component within the GUI may be based on, for example, prior positions previously used for the respective component, attributes associated with the user identifier, and/or attributes associated with the data to be displayed, among other attributes/factors. In some cases, the operations of block 616 may be performed by the machine learning model and/or a second machine learning model.

Based on or in response to determining the visual formats and the positions at block 616, server application 600 may be configured to update the framework definition by combining the first plurality of predetermined components and the second plurality of predetermined components, as indicated by block 618. For example, updating the framework definition may include adding the second plurality of components as a subset of one or more components of the first plurality of predetermined components, determining a union of the first plurality of components with the second plurality of components, and/or replacing the one or more components of the first plurality of components with the second plurality of components.

In some cases, the second plurality of components may form a subset of the one or more components of the first plurality of predetermined components. For example, the first plurality of predetermined components may define a plurality of tabs used for navigating the GUI, while the second plurality of components may represent the contents of one or more of these tabs. For example, a particular tab of the plurality of tabs may be configured, in response to selection thereof by way of client device 602, visually expand into and/or cause display of a panel that contains at least a portion of the second plurality of components. The first plurality of predetermined components may additionally and/or alternatively take the form of cards, lists, drop-down menus, or other navigational components. The framework definition may thus be updated by adding the second plurality of components as a subset of the one or more components of the first plurality of components.

In one example, the first plurality of predetermined components may include a "favorites" tab. The second plurality of components may thus represent resources, such as software applications, files, data, charts, and/or records, with which a user is determined and/or predicted to interact more frequently and/or preferentially relative to other resources. In another example, the first plurality of predetermined components may additionally or alternatively include a "recommended" tab and/or a "suggested" tab. The second plurality of components may thus represent resources that the machine learning model is recommending and/or suggesting for the user to interact with. These might include resources that the user is not yet using and that the machine learning model is predicting to be useful to the user.

In other cases, the second plurality of components may be at the same level of a hierarchy of the GUI as the first plurality of predetermined components. That is, the second plurality of components might not be a subset of the first plurality of predetermined components, and the second plurality of components may thus be displayed by the GUI independently of any user interactions with the first plurality of predetermined components. In one example, the second plurality of components and the first plurality of predetermined components may each occupy mutually exclusive portions (e.g., horizontal regions and/or vertical layers) of the GUI. The framework definition may thus be updated by determining a union of the second plurality of components with the first plurality of components.

In another example, one or more first components of the first plurality of predetermined components and one or more second components of the second plurality of components may each occupy the same portion of the GUI. The framework definition may thus be updated by replacing the one or more first components with the one or more second components, or vice versa. For example, some of the first plurality of predetermined components may be considered modifiable (e.g., may be provided as defaults for the GUI), while others may be considered fixed (e.g., some navigational components). Thus, a modifiable component may be replaceable by the one or more second components, while fixed components might not be replaceable by the one or more second components.

Based on or in response to updating of the framework definition at block 618, server application 600 may be configured to transmit, to client device 602, the framework definition as updated, as indicated by arrow 620. For example, the response at arrow 620 may take the form of an HTTP response and/or an asynchronous JAVASCRIPT® response, among other possibilities. Based on or in response to reception of the response at arrow 620, client device 602 may be configured to render the GUI based on the framework definition as updated, as indicated by block 622. Thus, the content of the displayed GUI may be tailored to the specific user that requested the GUI, and the user may be able to view and/or interact with the GUI.

VI. Example Machine Learning Models

Figure 7:
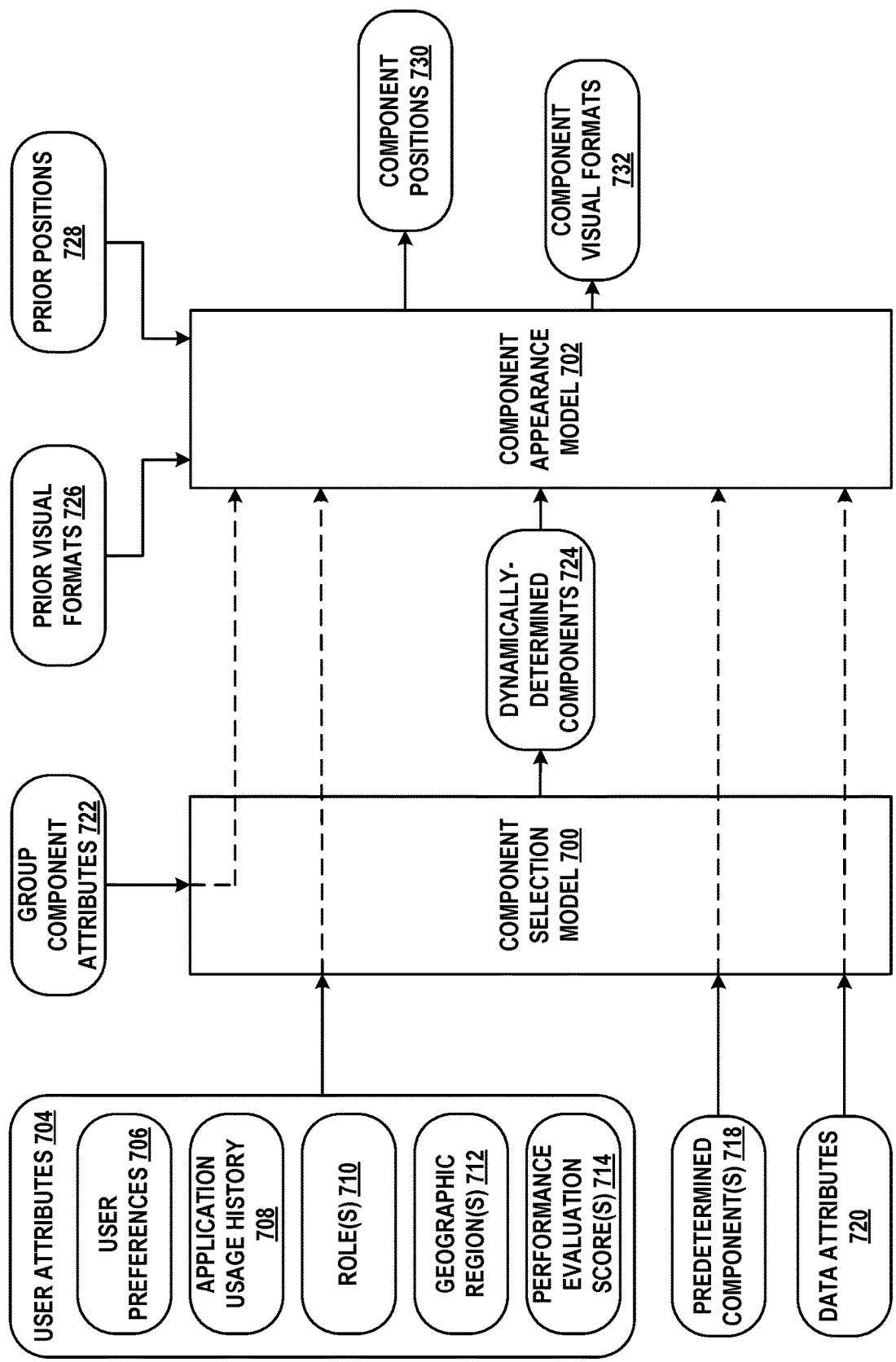
FIG. 7 illustrates a system that includes machine learning models, in accordance with example embodiments.

FIG. 7 illustrates an example system for generating aspects of a GUI. Specifically, FIG. 7 illustrates component selection model 700 configured to generate the second plurality of components to be displayed by the GUI, and component appearance model 702 configured to generate the positions and visual formats of the second plurality of components. Specifically, the second plurality of components is represented by dynamically-determined components 724, each of which may be associated with a corresponding component position of component positions 730 and a corresponding component visual format of component visual formats 732.

Model 700 and model 702 may each represent one or more machine learning algorithms, which may include supervised and/or unsupervised learning algorithms. For example, models 700 and 702 may include an artificial neural network. Thus, model 700 and/or model 702 may be trained based on labeled training data. In some cases, model 700 and/or model 702 may additionally or alternatively include one or more rule-based algorithms. For example, a rule-based algorithm may be configured to select dynamically-determined components based on (i) an output of the artificial neural network and/or (ii) an amount of space available within the GUI to be filled by dynamically-determined components. In some cases, the operations of models 700 and 702 may be combined into a single model. For example, the combined model may determine components 724, the components' positions 730, and the components' visual formats 732. Models 700 and/or 702 may form part of server application 600, or another software application communicatively connected to server application 600.

Component selection model 700 may be configured to generated dynamically-determined components 724 based on user attributes 704, predetermined component(s) 718, data attributes 720, and/or group component attributes 722, among other possible information which may be stored in persistent storage 604. Each of user attributes 704, predetermined component(s) 718, data attributes 720, and/or group component attributes 722 may signal one or more components to be included within the GUI, and component selection model 700 may be configured to weigh these signals in order to generate components 724. The weighing of each of these signals by model 700 may be determined via a learning process based on labeled training data. The labeled training data may include sets of (i) values for user attributes 704, predetermined component(s) 718, data attributes 720, and/or group component attributes 722 associated with (ii) a ground-truth dynamically-determined components deemed satisfactory to and/or preferred by a user associated with the values.

User attributes 704 may include user preferences 706, application usage history 708, role(s) 710, geographic region(s) 712, and performance evaluation score(s) 714, among other possible attributes. Specifically, user preferences 706 may include one or more settings and/or preferences set by the user associated with the user identifier. For example, user preferences 706 may indicate one or more components that the user has selected for inclusion in the GUI, respective positions of these one or more components, respective visual formats of these one or more components, one or more components that the user has selected for exclusion from the GUI, a color scheme for the GUI and/or aspects thereof, a font size of text in the GUI, and/or a sizing of components of the GUI, among other parameters associated with the GUI.

Application usage history 708 may indicate one or more applications used by the user during a particular period of time, a total usage time for each of the one or more applications, and/or a frequency with which each of the one or more applications is invoked by the user, among other application usage parameters. In one example, a user may indicate via user preferences 706 that a particular component is to be included in the GUI, but application usage history 708 may indicate that the particular component is used relatively infrequently by the user. Thus, model 700 may be configured to replace the particular component with another component that the user is expected to use relatively more frequently. Accordingly, rather than treating user preferences 706 as determinative of components 724, model 700 may instead weigh user preferences 706 against application usage history 708 (and other attributes) to generate components 724 that attempt to more accurately meet the user's predicted/anticipated needs. Similarly, user attributes 704, predetermined component(s) 718, data attributes 720, and/or group component attributes 722 may be weighed against one another according to weights determined by training model 700, thus generating components 724 that may change over time based on various factors.

Role(s) 710 may indicate one or more roles or positions of the user within managed network 300 and/or within an entity associated with managed network 300. For example, the user may be an IT technician within managed network 300, and may thus be expected to use one or more IT-specific software applications. Since aspects of these IT-specific software applications could be linked and/or provided via the GUI, role(s) 710 may provide information regarding the desired content of the GUI.

Geographic region(s) 712 may indicate one or more geographic areas in which the user resides, in which the user works, and/or which the user serves, among other possibilities. Performance evaluation score(s) 714 may indicate one or more performance scores assigned to the user by one or more other users, such as the user's supervisor and/or the user's peers. For example, when the user scores low on responsiveness to communication, the GUI may be configured to include components that display to the user new communication to which the user has not yet responded.

Predetermined component(s) 718 may indicate a particular subset of the first plurality of predetermined components in connection with which component selection model 700 is to generate dynamically-determined components 724. For example, predetermined component(s) 718 may indicate that component selection model 700 is to generate dynamically-determined components 724 for a "favorites" tab, a "recommended" tab, and/or a "suggested" tab included in the first plurality of predetermined components within the GUI. Alternatively, predetermined component(s) 718 may indicate a context for which component selection model 700 is to generate dynamically-determined components 724. That is, predetermined component(s) 718 may indicate a particular GUI to be rendered. For example, predetermined components(s) 718 may indicate that the first plurality of predetermined components defines part of a web page that provides a summary of one or more IT-specific software applications. Thus, component selection model 700 may be configured to select dynamically-determined components 724 that summarize the states and/or outputs of the one or more IT-specific software applications. Accordingly, predetermined component(s) 718 may at least in part define a set of candidate components from which dynamically-determined components 724 are selected.

In some cases, component selection model 700 may include therein a plurality of sub-models, each of which may be tailored to a particular one of predetermined component(s) 718 and/or a particular context/GUI indicated by predetermined component(s) 718. For example, each sub-model may be an artificial neural network, and each output neuron of the artificial neural network may represent a candidate component that may be included as part of dynamically-determined components 724. Based on predetermined component(s) 718, a particular sub-model may be selected from the plurality of sub-models, and the particular sub-model may be used to generate scores for each of the candidate components associated therewith. Based on the scores, dynamically-determined components 724 may be selected from the candidate components associated with the particular sub-model.

Data attributes 720 may indicate an amount of data to be displayed by each candidate component, a priority level associated with the data to be displayed, a time at which the data to be displayed was generated and/or updated, and/or a source of the data, among other parameters of the data to be displayed. Thus, data attributes 720 may signal the importance of a candidate component and/or a size of the candidate component associated with adequately and/or completely displaying the data.

Group component attributes 722 may include one or more attributes of one or more components generated in connection with one or more other user identifiers belonging to a same group as the user identifier associated with user attributes 704. Specifically, user attributes 704 may be associated with a particular user for which the GUI is being generated, while group component attributes 722 may be associated with other users that are similar to the particular user. Group component attributes 722 may indicate the components that the similar users are provided with and/or using, the components' positions within the respective GUIs, and the component's visual formats, among other attributes. The particular user may be assigned to a group based on, for example, role(s) 710 and/or geographic region(s) 712, among other possibilities. Thus, group component attributes 722 may signal components that the particular user might benefit from being provided with based on the behavior of the user's group peers. As the user's group changes, the user may be provided with different components that more closely match the components used by other users in the new group.

Component appearance model 702 may be configured to generate component positions 730 and component visual formats 732 for dynamically-determined components 724 based on user attributes 704, predetermined component(s) 718, data attributes 720, and group component attributes 722, as indicated by the dashed lines, as well as prior visual formats 726, and/or prior positions 728, among other possible information. User attributes 704, predetermined component(s) 718, data attributes 720, and/or group component attributes 722 may include the information discussed above, as well as any other data related to the determination of component positions 730 and component visual formats 732.

Component positions 730 may indicate the respective position within the GUI for each of dynamically-determined components 724. For example, each component position may indicate a corresponding area of the GUI occupied by the corresponding component. Component visual formats 732 may indicate the respective visual appearance of each of dynamically-determined components 724. For example, component visual formats 732 may indicate whether a particular component is to be displayed as a card, a list, a graph, a table, a text field, a modal window, and/or an overlay, among other possibilities. Component visual format 732 may also indicate one or more colors for the particular component, a font size of text in the particular component, and/or an animation for the particular component, among other visual properties of the particular component.

Prior positions 728 may indicate, for each respective component of components 724, where the respective component appeared as part of prior renderings of the GUI. In some cases, model 702 may be configured to control the rate of movement of the respective component with respect to the GUI across consecutive generations of the GUI. For example, since a user may be expected to generally look in the same region of the GUI when looking for the respective component, model 702 may determine component positions that result in the respective component changing its position by no more than a threshold distance between consecutive generations of the GUI. This may allow the user to more easily find the respective component within the GUI (e.g., by looking at a particular region therein), since movement of the respective component may be gradual, rather than abrupt.

Similarly, prior visual formats 726 may indicate, for each respective component of components 724, how the respective component appeared as part of prior renderings of the GUI. In some cases, model 702 may be configured to control the rate of change in the visual appearance of the respective component across consecutive generations of the GUI. For example, since a user may be expected to generally look for a particular shape, size, color, and/or other visual property when looking for the respective component, model 702 may be configured to determine component visual formats that result in the respective component changing its shape, size, color, and/or other visual property by no more than a threshold extent between consecutive generations of the GUI. This may allow the user to more easily find the respective component within the GUI (e.g., by looking for a particular visual pattern or property), since changes in the visual appearance of the respective component may be gradual, rather than abrupt.

After dynamically-determined components 724, positions 730, and visual formats 732 are generated, the GUI may be rendered by way of a client device. The GUI may be configured to allow users to make manual modifications to the GUI after it is displayed. Specifically, the GUI may allow for manual modifications to dynamically-determined components 724 (e.g., replacement of a component with another component that is not part of components 724), component positions 730 (e.g., dragging one or more of components 724 to different locations), and/or component visual formats 732. For example, each component may be associated with a settings menu that provides for such manual modifications, or a separate webpage may be provided that allows for modifications to be made to the rendered GUI. Such manual modifications may indicate corrections or improvements that the user has made to the output of model 700 and/or 702. In some cases, the state of the GUI after a manual modification may be considered to be more preferable and/or optimal than the initially-generated GUI.

Thus, in some cases, the manual modifications, and/or the absence thereof, may be used to generate training data that may be used to train model 700 and/or model 702. Specifically, since the state of the GUI after a manual modification may be considered preferable, satisfactory, and/or optimal for the user making the manual modification, it may constitute a "ground-truth" GUI. Thus, the state of the GUI after the manual modification may be paired with values of user attributes 704, predetermined component(s) 718, data attributes 720, group component attributes 722, prior visual formats 726, and/or prior positions 728. Similarly, a GUI that has been rendered multiple times in the same manner and was not manually modified may be used as a "ground truth" GUI. Models 700 and/or 702 may be trained and/or retrained based on such pairs of "ground-truth" GUI and corresponding values for the various model inputs. Thus, GUIs generated by models 700 and 702 may be used to generate further training data for these models.

VII. Example User Interfaces

FIG. 8A, 8B, and 8C illustrate example aspects of a GUI generated by way of the operations and/or systems discussed with respect to FIGS. 6 and 7. Specifically, FIG. 8A illustrates GUI 800, which includes a first plurality of predetermined components and a second plurality of components determined by way of a machine learning model. The first plurality of predetermined components may include logo 802, "all" tab 804, "favorites" tab 806, "recommended" tab 808, and "workspaces" tab 810, among other possible tabs, as indicated by the ellipsis.

Each component that is predetermined is indicated with a dotted pattern, while components that are dynamically-determined by the machine learning model are shown in white. Notably, the specific grouping of components into predetermined components and dynamically-determined components shown in FIGS. 8A, 8B, and 8C is provided for the purpose of example. In some cases, the components shown in FIGS. 8A, 8B, and 8C may be grouped in other ways, with some predetermined components being instead dynamically-determined, or vice versa.

Logo 802 may include an image, text, and/or an animation associated with remote network management platform 320 and/or managed network 300. All tab 804 may be configured to list all resources, such as software applications, webpages, and/or files, available to a particular user (associated with a corresponding user identifier). Favorites tab 806 may be configured to list resources that the machine learning model has determined to be relatively more frequently used and/or otherwise preferred by the user. Recommended tab 808 may be configured to list resources that the machine learning model has determined to be useful to the user, and has thus recommended for the user to utilize. Workspaces tab 810 may include one or more resources organized by the user into one or more predetermined hierarchies.

In the example shown in FIG. 8A, the second plurality of components may be determined by the machine learning model as a way to fill and/or populate favorites tab 806 and/or recommended tab 808. For example, favorites panel 812 (displayed in response to selection of favorites tab 806) may be populated with text field 814, cards 818, 822, 826, and 830 (i.e., cards 818-830), and list items 836, 840, 844, and 848 (i.e., list items 836-848).

Text field 814 may be associated with a filter function configured to search the contents of favorites panel 812 and/or other "favorites" that might not be shown in favorites panel 812. In order to represent the resource associated therewith, each of cards 818-830 may include a corresponding icon (i.e., icons 820, 824, 828, and 832, respectively), a corresponding card title, and a corresponding set of card details. Similarly, in order to represent the resource associated therewith, each of list items 836-848 may include a corresponding icon (i.e., icons 838, 842, 846, and 850, respectively), a corresponding list item title, and a corresponding set of list item details.

Each of components 814, 818-830, and 836-848 may be determined by component selection model 700, and may thus represent dynamically-determined components 724. The positioning and visual appearance of each of components 814, 818-830, and 836-848 may be determined by component appearance model 702. That is, component appearance model 702 may determine that text field 814 is to be positioned at the top of favorites panel 812, components 818-830 are to be cards positioned below component 814 (i.e., around the middle of favorites panel 812), and components 836-848 are to be list items positioned below components 818-830 (i.e., near the bottom of favorites panel 812). Component appearance model 702 may also determine the size, color, font size, and/or other visual parameters of these components which might not be shown in FIG. 8A.

In some cases, component appearance model 702 may instead determine that all of components 818-830 and 836-848 are to be cards, that all of components 818-830 and 836-848 are to be list items, or that a different portion of components 818-830 and 836-848 is to be cards while the rest are to be list items. Thus, the contents of favorites panel 812 (e.g., components 814, 818-830, and 836-848), as well as the contents' positions and visual formats, may vary over time as the inputs to models 700 and 702 change, and/or as models 700 and/or 702 are retrained. Models 700 and 702 may similarly determine the contents of a recommended panel displayed in response to selection of recommended tab 808. Selection of a particular component from components 818-830 and/or 836-848 may cause additional data associated with the component to be loaded into GUI 800, and/or another GUI to be generated corresponding to the particular component.

FIG. 8B and 8C illustrate other aspects of GUI 800 for which models 700 and 702 may be used to generate components. Specifically, FIG. 8B illustrates workspaces panel 854, which may be displayed in response to selection of workspaces tab 810. Each of the components shown within workspaces panel 854 may be predetermined, rather than dynamically-determined by models 700 and 702. Specifically, workspaces panel 854 may include text field 856 associated with a filter function, IT suite tab 860, CSM suite tab 862, and HR suite tab 864. Each of IT suite tab 860, CSM suite tab 862, and HR suite tab 864 may be configured to, when selected, expand (e.g., cause display of an additional panel) to display additional components. For example, IT suite tab 860 may be configured to expand to display IT overview component 866, agent workspace component 868, collaboration owner workspace 870, software asset management component 872, and vulnerability incident response component 874.

Each of tabs 862 and 864 may also provide a corresponding "overview" component. The overview component (e.g., IT overview component 866) may, when selected, be configured to trigger the display of an overview overlay, aspects of which may be filled and/or populated by components generated by models 700 and 702. For example, when IT overview component 866 is selected, GUI 800 may be configured to display IT overview overlay 878, as shown in FIG. 8C. Namely, IT overview 878 may be overlaid on top of at least part of the contents of FIG. 8B to provide a summary of states associated with agent workspace component 868, collaboration owner workspace 870, software asset management component 872, and vulnerability incident response component 874.

Specifically, as shown in FIG. 8C, each of components 868, 870, 872, and 874 may be provided with corresponding components 880, 886, 888, and 890, respectively, within IT overview overlay 878. While components 880, 886, 888, and 890 may be predetermined, the contents thereof may be dynamically-determined by models 700 and 702. For example, agent workspace component 880 may be populated with cards 882, 883, and 884, and message 885, each of which may be determined by models 700 and 702 as representative of a state associated with agent workspace 868. Agent workspace 868 represent a software application used to manage IT incidents. Thus, cards 882, 883, and 884, and message 885 may summarize one or more aspects of various IT incidents for the user requesting GUI 800 to be rendered. Since the agent workspace may include large amounts of information, models 700 and 702 may be configured to select components that succinctly summarize the information deemed important for the particular user. For example, cards 882, 883, and 884, and message 885 may be selected based on portions of the agent workspace software application with which the particular user most frequently interacts, and/or which correspond to the particular user's role, among other factors.

Similarly, collaboration owner workspace 886 may be populated with table 887, software asset management component 888 may be populated with graph 889, and vulnerability incident response component 890 may be populated with graph 891. Table 887, graph 889, and graph 891 may be selected, for example, one the basis of the user frequently viewing these tables/graphs when using the corresponding software applications, and/or based on other users frequently viewing these tables/graphs, among other possible factors. Thus, models 700 and 702 may dynamically determine components that are expected to be useful for summarizing application states to a particular user. Different users may thus see different components when viewing IT overview overlay 878. For example, a different user might instead be provided with a graph as part of agent workspace component 880, rather than cards 882, 883, and 884, and message 885.

VIII. Example Operations

Figure 9:
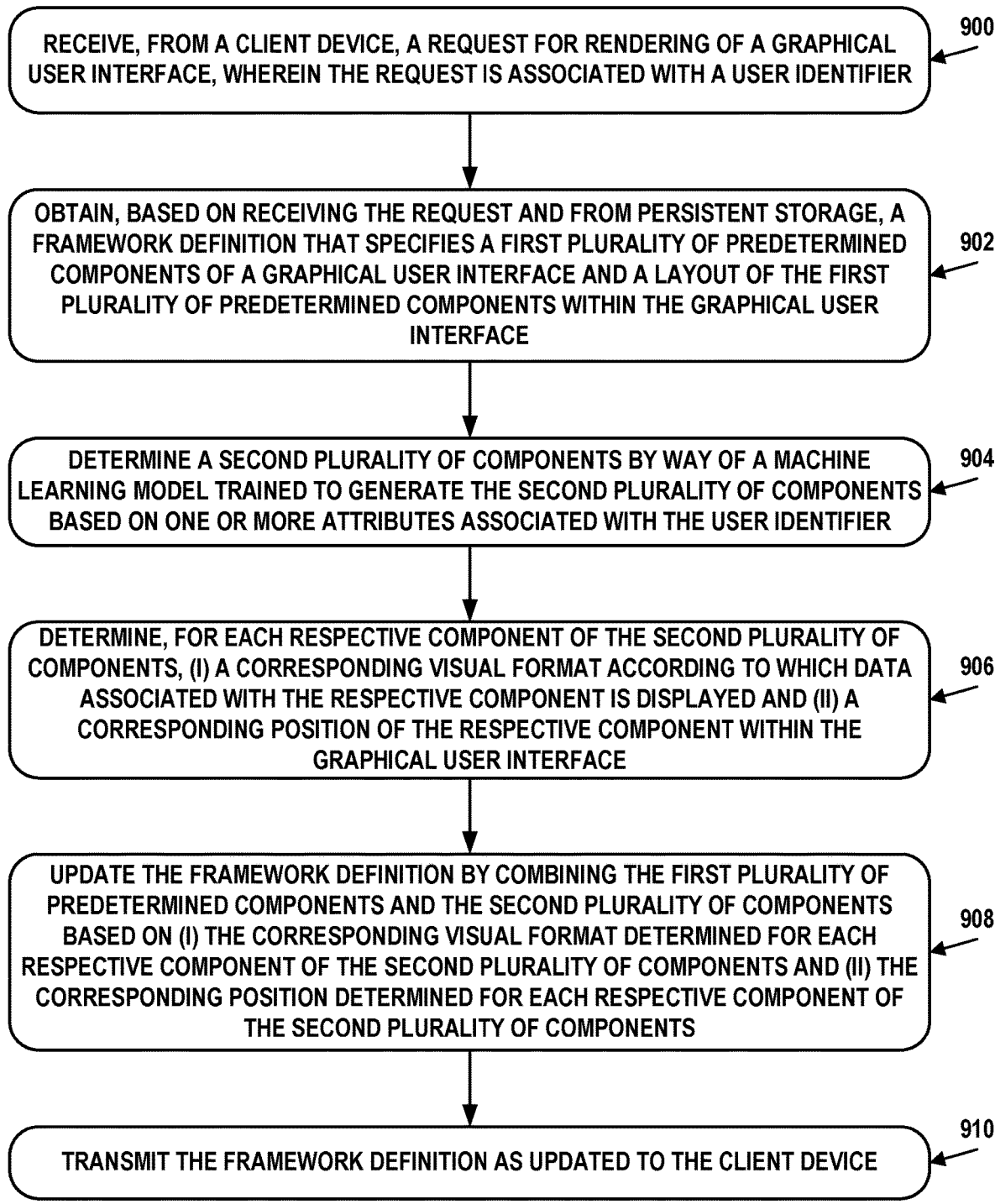
FIG. 9 is a flow chart, in accordance with example embodiments.

FIG. 9 is a flow chart illustrating an example embodiment. The process illustrated by FIG. 9 may be carried out by a computing device, such as computing device 100, and/or a cluster of computing devices, such as server cluster 200. However, the process can be carried out by other types of devices or device subsystems. For example, the process could be carried out by a computational instance of a remote network management platform or a portable computer, such as a laptop or a tablet device.

The embodiments of FIG. 9 may be simplified by the removal of any one or more of the features shown therein. Further, these embodiments may be combined with features, aspects, and/or implementations of any of the previous figures or otherwise described herein.

Block 900 may include receiving, from a client device, a request for rendering of a graphical user interface. The request may be associated with a user identifier.

Block 902 may include obtaining, based on receiving the request and from persistent storage, a framework definition that specifies a first plurality of predetermined components of a graphical user interface and a layout of the first plurality of predetermined components within the graphical user interface.

Block 904 may include determining a second plurality of components by way of a machine learning model trained to generate the second plurality of components based on one or more attributes associated with the user identifier.

Block 906 may include determining, for each respective component of the second plurality of components, (i) a corresponding visual format according to which data associated with the respective component is displayed and (ii) a corresponding position of the respective component within the graphical user interface.

Block 908 may include updating the framework definition by combining the first plurality of predetermined components and the second plurality of components based on (i) the corresponding visual format determined for each respective component of the second plurality of components and (ii) the corresponding position determined for each respective component of the second plurality of components.

Block 910 may include transmitting the framework definition as updated to the client device.

In some embodiments, updating the framework definition by combining the first plurality of predetermined components and the second plurality of components may include incorporating the second plurality of components into a first component of the first plurality of predetermined components. The first component may be configured to expand to display the second plurality of components in response to selection of the first component by way of the client device.

In some embodiments, the first component may be a favorites section of the graphical user interface and the second plurality of components may be determined to be more frequently used in connection with the user identifier than other candidate components of the graphical user interface.

In some embodiments, the first component may be a recommended section of the graphical user interface and the second plurality of components may represent recommendations made for the user identifier by the machine learning model.

In some embodiments, updating the framework definition by combining the first plurality of predetermined components and the second plurality of components may include replacing a subset of the first plurality of predetermined components with the second plurality of components.

In some embodiments, determining, for each respective component of the second plurality of components, the corresponding visual format according to which data associated with the respective component is displayed may include selecting, for each respective component of the second plurality of components, some or all of the data to be displayed by the respective component.

In some embodiments, the corresponding visual format according to which data associated with the respective component is displayed may be determined based on one or more prior visual formats previously used for the respective component in connection with the user identifier.

In some embodiments, the corresponding position of the respective component within the graphical user interface may be determined based on one or more prior positions previously used for the respective component in connection with the user identifier.

In some embodiments, the corresponding visual format according to which data associated with the respective component is displayed and the corresponding position of the respective component within the graphical user interface may each be determined by way of a second machine learning model trained to generate the corresponding visual format and the corresponding position based on one or more of: (i) the one or more attributes associated with the user identifier, (ii) one or more attributes of the first plurality of predetermined components, (iii) one or more attributes of the data associated with the respective component, or (iv)

one or more attributes of one or more components generated in connection with one or more other user identifiers belonging to a same group as the user identifier.

In some embodiments, an indication of a manual modification may be received from the client device. The manual modification may be a modification to one or more components of the second plurality of components, such as a modification to the corresponding positions of the one or more components of the second plurality of components or the corresponding visual formats of one or more components of the second plurality of components. Based on the indication of the manual modification, training data for the machine learning model may be generated. The training data may include (i) a representation of the graphical user interface following the manual modification and (ii) the one or more attributes associated with the user identifier. The machine learning model may be configured to be retrained based on the training data. The training data may be stored in the persistent storage.

In some embodiments, the one or more attributes associated with the user identifier may include one or more of: (i) one or more user preferences associated with the user identifier, (ii) an application usage history associated with the user identifier, (iii) a role associated with the user identifier, (iv) a geographic region associated with the user identifier, or (v) a performance evaluation score associated with the user identifier.

In some embodiments, the machine learning model may also be trained to generate the second plurality of components based on one or more attributes of one or more components generated in connection with one or more other user identifiers belonging to a same group as the user identifier.

In some embodiments, the machine learning model may also be trained to generate the second plurality of components based on one or more attributes associated with a plurality of candidate data. The plurality of candidate data may be configured to be displayed by way of the graphical user interface. For each respective component of the second plurality of components, the data associated with the respective component may be selected from the plurality of candidate data.

In some embodiments, a particular predetermined component of the first plurality of predetermined components may be selected, where the second plurality of components is to be incorporated into the particular predetermined component. An identifier of the particular predetermined component may be provided to the machine learning model. The machine learning model may also be trained to generate the second plurality of components based on the identifier of the particular predetermined component.

In some embodiments, the corresponding visual format may include at least one of: (i) a card, (ii) a list, (iii) a graph, (iv) a table, (v) a text field, (vi) a modal window, or (vii) an overlay.

In some embodiments, the framework definition may indicate a predetermined grouping of a subset of the first plurality of predetermined components. Each respective component within the predetermined grouping may represent a corresponding software application. The second plurality of components may be configured to summarize respective states associated with the corresponding software applications of the predetermined grouping.

IX. Closing

The present disclosure is not to be limited in terms of the particular embodiments described in this application, which are intended as illustrations of various aspects. Many modifications and variations can be made without departing from its scope, as will be apparent to those skilled in the art. Functionally equivalent methods and apparatuses within the scope of the disclosure, in addition to those described herein, will be apparent to those skilled in the art from the foregoing descriptions. Such modifications and variations are intended to fall within the scope of the appended claims.

The above detailed description describes various features and operations of the disclosed systems, devices, and methods with reference to the accompanying figures. The example embodiments described herein and in the figures are not meant to be limiting. Other embodiments can be utilized, and other changes can be made, without departing from the scope of the subject matter presented herein. It will be readily understood that the aspects of the present disclosure, as generally described herein, and illustrated in the figures, can be arranged, substituted, combined, separated, and designed in a wide variety of different configurations.

With respect to any or all of the message flow diagrams, scenarios, and flow charts in the figures and as discussed herein, each step, block, and/or communication can represent a processing of information and/or a transmission of information in accordance with example embodiments. Alternative embodiments are included within the scope of these example embodiments. In these alternative embodiments, for example, operations described as steps, blocks, transmissions, communications, requests, responses, and/or messages can be executed out of order from that shown or discussed, including substantially concurrently or in reverse order, depending on the functionality involved. Further, more or fewer blocks and/or operations can be used with any of the message flow diagrams, scenarios, and flow charts discussed herein, and these message flow diagrams, scenarios, and flow charts can be combined with one another, in part or in whole.

A step or block that represents a processing of information can correspond to circuitry that can be configured to perform the specific logical functions of a herein-described method or technique. Alternatively or additionally, a step or block that represents a processing of information can correspond to a module, a segment, or a portion of program code (including related data). The program code can include one or more instructions executable by a processor for implementing specific logical operations or actions in the method or technique. The program code and/or related data can be stored on any type of computer readable medium such as a storage device including RAM, a disk drive, a solid state drive, or another storage medium.

The computer readable medium can also include non-transitory computer readable media such as computer readable media that store data for short periods of time like register memory and processor cache. The computer readable media can further include non-transitory computer readable media that store program code and/or data for longer periods of time. Thus, the computer readable media may include secondary or persistent long term storage, like ROM, optical or magnetic disks, solid state drives, or compact-disc read only memory (CD-ROM), for example. The computer readable media can also be any other volatile or non-volatile storage systems. A computer readable medium can be considered a computer readable storage medium, for example, or a tangible storage device.

Moreover, a step or block that represents one or more information transmissions can correspond to information transmissions between software and/or hardware modules in the same physical device. However, other information transmissions can be between software modules and/or hardware modules in different physical devices.

The particular arrangements shown in the figures should not be viewed as limiting. It should be understood that other embodiments can include more or less of each element shown in a given figure. Further, some of the illustrated elements can be combined or omitted. Yet further, an example embodiment can include elements that are not illustrated in the figures.

While various aspects and embodiments have been disclosed herein, other aspects and embodiments will be apparent to those skilled in the art. The various aspects and embodiments disclosed herein are for purpose of illustration and are not intended to be limiting, with the true scope being indicated by the following claims.

What is claimed is:

1. A system comprising:
a persistent storage containing a framework definition that specifies a first plurality of predetermined components of a graphical user interface and a layout of the first plurality of predetermined components within the graphical user interface, wherein each respective predetermined component of the first plurality of predetermined components is associated with a corresponding software application and occupies a corresponding frame that forms a bounded portion of the graphical user interface;
a processor configured to perform operations comprising:
receiving, from a client device, a request for rendering of the graphical user interface, wherein the request is associated with a user identifier;
obtaining, based on receiving the request and from the persistent storage, the framework definition;
determining, by way of a machine learning model, a second plurality of components comprising, for each respective predetermined component of the first plurality of predetermined components, corresponding one or more components, wherein the machine learning model is configured to generate the corresponding one or more components based on (i) one or more attributes associated with the user identifier, (ii) an identifier of the respective predetermined component, (iii) data representing one or more states of the corresponding software application, and (iv) at least one attribute of at least one component generated in connection with one or more other user identifiers belonging to a same group as the user identifier, wherein the corresponding one or more components are generated by the machine learning model to summarize the one or more states of the corresponding software application by displaying a corresponding data subset selected by the machine learning model from the data representing the one or more states;
determining, for each respective component of the second plurality of components, (i) a corresponding visual format according to which data selected for the respective component is displayed and (ii) a corresponding position of the respective component within the corresponding frame of a corresponding predetermined component of the first plurality of predetermined components;
updating the framework definition by combining the first plurality of predetermined components and the second plurality of components based on (i) the corresponding visual format determined for each respective component of the second plurality of components and (ii) the corresponding position determined for each respective component of the second plurality of components; and
transmitting the framework definition as updated to the client device.

2. The system of claim 1, wherein updating the framework definition by combining the first plurality of predetermined components and the second plurality of components comprises:
for each respective predetermined component of the first plurality of predetermined components, incorporating the corresponding one or more components into the respective predetermined component, wherein the respective predetermined component is configured to expand to display the corresponding one or more components in response to selection of the respective predetermined component by way of the client device.

3. The system of claim 1, wherein: (i) the framework definition further comprises a predetermined favorites component that represents a favorites section of the graphical user interface and the machine learning model is configured to generate, based on the one or more attributes and an identifier of the predetermined favorites component, one or more favorites components determined to be more frequently used in connection with the user identifier than other candidate components of the graphical user interface or (ii) the framework definition further comprises a predetermined recommended component that represents a recommended section of the graphical user interface and the machine learning model is configured to generate, based on the one or more attributes associated with the user identifier and an identifier of the predetermined recommended component, one or more recommended components that represent recommendations made for the user identifier by the machine learning model.

4. The system of claim 1, wherein the corresponding visual format according to which data selected for the respective component is displayed is determined based on one or more prior visual formats previously used for the respective component in a prior rendering of the graphical user interface in connection with the user identifier, and wherein the corresponding position of the respective component within the corresponding predetermined component is determined based on one or more prior positions previously used for the respective component in the prior rendering of the graphical user interface in connection with the user identifier.

5. The system of claim 1, wherein the corresponding visual format according to which data selected for the respective component is displayed and the corresponding position of the respective component within the corresponding frame of the corresponding predetermined component are each determined by way of a second machine learning model trained to generate the corresponding visual format and the corresponding position based on one or more of: (i) the one or more attributes associated with the user identifier, (ii) one or more attributes of the corresponding predetermined component of the first plurality of predetermined components, (iii) one or more attributes of the data selected for the respective component, or (iv) the at least one attribute of the at least one component generated in connection with the one or more other user identifiers belonging to the same group as the user identifier.

6. The system of claim 1, wherein the operations further comprise:
receiving, from the client device, an indication of a manual modification to one or more components of the second plurality of components;
generating, based on the indication of the manual modification, training data for the machine learning model, wherein the training data comprises (i) a representation of the graphical user interface following the manual modification and (ii) the one or more attributes associated with the user identifier, and wherein the machine learning model is configured to be retrained based on the training data; and
storing, in the persistent storage, the training data.

7. The system of claim 1, wherein the one or more attributes associated with the user identifier comprise one or more of: (i) one or more user preferences associated with the user identifier, (ii) an application usage history associated with the user identifier, (iii) a role associated with the user identifier, (iv) a geographic region associated with the user identifier, or (v) a performance evaluation score associated with the user identifier.

8. The system of claim 1, wherein the machine learning model is configured to select the corresponding data subset from the data representing the one or more states further based on one or more attributes associated with the one or more states as represented by the data.

9. The system of claim 1, wherein the corresponding visual format comprises at least one of: (i) a card, (ii) a list, (iii) a graph, (iv) a table, (v) a text field, (vi) a modal window, or (vii) an overlay.

10. The system of claim 1, wherein the framework definition indicates a predetermined grouping of a subset of the first plurality of predetermined components and includes an overview component representing the predetermined grouping, wherein selection of the overview component by way of the client device is configured to cause the client device to simultaneously display each respective predetermined component of the subset and the corresponding one or more components of each respective predetermined component to simultaneously summarize, for each respective predetermined component of the subset, the one or more states of the corresponding software application.

11. A computer-implemented method comprising:
receiving, from a client device, a request for rendering of a graphical user interface, wherein the request is associated with a user identifier;
obtaining, based on receiving the request and from persistent storage, a framework definition that specifies a first plurality of predetermined components of the graphical user interface and a layout of the first plurality of predetermined components within the graphical user interface, wherein each respective predetermined component of the first plurality of predetermined components is associated with a corresponding software application and occupies a corresponding frame that forms a bounded portion of the graphical user interface;
determining, by way of a machine learning model, a second plurality of components comprising, for each respective predetermined component of the first plurality of predetermined components, corresponding one or more components, wherein the machine learning model is configured to generate the corresponding one or more components based on (i) one or more attributes associated with the user identifier, (ii) an identifier of the respective predetermined component, and (iii) data representing one or more states of the corresponding software application, wherein the corresponding one or more components are generated by the machine learning model to summarize the one or more states of the corresponding software application by displaying a corresponding data subset selected by the machine learning model from the data representing the one or more states;
determining, for each respective component of the second plurality of components, (i) a corresponding visual format according to which data selected for the respective component is displayed and (ii) a corresponding position of the respective component within the corresponding frame of a corresponding predetermined component of the first plurality of predetermined components;
updating the framework definition by combining the first plurality of predetermined components and the second plurality of components based on (i) the corresponding visual format determined for each respective component of the second plurality of components and (ii) the corresponding position determined for each respective component of the second plurality of components, wherein updating the framework definition comprises, for each respective predetermined component of the first plurality of predetermined components, incorporating the corresponding one or more components into the respective predetermined component, and wherein the respective predetermined component is configured to expand to display the corresponding one or more components in response to selection of the respective predetermined component by way of the client device; and
transmitting the framework definition as updated to the client device.

12. The computer-implemented method of claim 11, wherein the corresponding visual format according to which data selected for the respective component is displayed is determined based on one or more prior visual formats previously used for the respective component in a prior rendering of the graphical user interface in connection with the user identifier, and wherein the corresponding position of the respective component within the corresponding predetermined component is determined based on one or more prior positions previously used for the respective component in the prior rendering of the graphical user interface in connection with the user identifier.

13. The computer-implemented method of claim 11, further comprising:
receiving, from the client device, an indication of a manual modification to one or more components of the second plurality of components; and
generating, based on the indication of the manual modification, training data for the machine learning model, wherein the training data comprises (i) a representation of the graphical user interface following the manual modification and (ii) the one or more attributes associated with the user identifier, and wherein the machine learning model is configured to be retrained based on the training data; and
storing, in the persistent storage, the training data.

14. The computer-implemented method of claim 11, wherein the framework definition indicates a predetermined grouping of a subset of the first plurality of predetermined components and includes an overview component representing the predetermined grouping, wherein selection of the overview component by way of the client device is configured to cause the client device to simultaneously display each respective predetermined component of the subset and the corresponding one or more components of each respective predetermined component to simultaneously summarize, for each respective predetermined component of the subset, the one or more states of the corresponding software application.

15. An article of manufacture including a non-transitory computer-readable medium, having stored thereon program instructions that, upon execution by a computing system, cause the computing system to perform operations comprising:

receiving, from a client device, a request for rendering of a graphical user interface, wherein the request is associated with a user identifier;

obtaining, based on receiving the request and from persistent storage, a framework definition that specifies a first plurality of predetermined components of the graphical user interface and a layout of the first plurality of predetermined components within the graphical user interface, wherein each respective predetermined component of the first plurality of predetermined components is associated with a corresponding software application and occupies a corresponding frame that forms a bounded portion of the graphical user interface;

determining, by way of a machine learning model, a second plurality of components comprising, for each respective predetermined component of the first plurality of predetermined components, corresponding one or more components, wherein the machine learning model is configured to generate the corresponding one or more components based on (i) one or more attributes associated with the user identifier, (ii) an identifier of the respective predetermined component, and (iii) data representing one or more states of the corresponding software application, wherein the corresponding one or more components are generated by the machine learning model to summarize the one or more states of the corresponding software application by displaying a corresponding data subset selected by the machine learning model from the data representing the one or more states;

determining, for each respective component of the second plurality of components, (i) a corresponding visual format according to which data selected for the respective component is displayed and (ii) a corresponding position of the respective component within the corresponding frame of a corresponding predetermined component of the first plurality of predetermined components;

updating the framework definition by combining the first plurality of predetermined components and the second plurality of components based on (i) the corresponding visual format determined for each respective component of the second plurality of components and (ii) the corresponding position determined for each respective component of the second plurality of components;

transmitting the framework definition as updated to the client device;

receiving, from the client device, an indication of a manual modification to one or more components of the second plurality of components;

generating, based on the indication of the manual modification, training data for the machine learning model, wherein the training data comprises (i) a representation of the graphical user interface following the manual modification and (ii) the one or more attributes associated with the user identifier, and wherein the machine learning model is configured to be retrained based on the training data; and storing, in the persistent storage, the training data.

16. The system of claim 1, wherein the machine learning model is configured to select the corresponding data subset from the data representing the one or more states based on an expected importance of the one or more states to a user associated with the user identifier.

17. The system of claim 4, wherein the corresponding visual format is determined such that a rate of visual change between the corresponding visual format and the one or more prior visual formats is under a threshold rate of visual change, and wherein the corresponding position of the respective component is determined such that a rate of positional change between the corresponding position and the one or more prior positions is under a threshold rate of positional change.

18. The computer-implemented method of claim 11, wherein the machine learning model is configured to determine the second plurality of components further based on at least one attribute of at least one component generated in connection with one or more other user identifiers belonging to a same group as the user identifier.

19. The computer-implemented method of claim 11, wherein the machine learning model is configured to select the corresponding data subset from the data representing the one or more states based on an expected importance of the one or more states to a user associated with the user identifier.

20. The computer-implemented method of claim 12, wherein the corresponding visual format is determined such that a rate of visual change between the corresponding visual format and the one or more prior visual formats is under a threshold rate of visual change, and wherein the corresponding position of the respective component is determined such that a rate of positional change between the corresponding position and the one or more prior positions is under a threshold rate of positional change.

* * * * *